US012645736B2

(12) United States Patent
Ouimet et al.

(10) Patent No.: US 12,645,736 B2
(45) Date of Patent: Jun. 2, 2026

(54) REDIRECTION TO DIGITAL CONTENT BASED ON IMAGE-SEARCH

(71) Applicant: Snap Inc., Santa Monica, CA (US)

(72) Inventors: Kirk Ouimet, Orem, UT (US); Rong Yan, Marina Del Rey, CA (US); Yantao Zheng, Sunnyvale, CA (US); Timothy Michael Sehn, Marina Del Rey, CA (US); Evan Spiegel, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 19/002,438

(22) Filed: Dec. 26, 2024

(65) Prior Publication Data

US 2025/0124074 A1      Apr. 17, 2025

Related U.S. Application Data

(63) Continuation of application No. 15/008,956, filed on Jan. 28, 2016, now Pat. No. 12,216,702.

(Continued)

(51) Int. Cl.
| | |
|---|---|
| *G06F 16/78* | (2019.01) |
| *G06F 3/16* | (2006.01) |
| *G06F 16/432* | (2019.01) |
| *G06F 16/48* | (2019.01) |
| *G06F 16/487* | (2019.01) |

(Continued)

(52) U.S. Cl.
CPC ............ *G06F 16/78* (2019.01); *G06F 16/434* (2019.01); *G06F 16/487* (2019.01); *G06F 16/489* (2019.01); *G06F 16/51* (2019.01); *G06F 16/58* (2019.01); *G06F 16/583* (2019.01);

(Continued)

(58) Field of Classification Search
CPC ...... G06F 16/53; G06F 16/433; G06F 16/434; G06F 16/487
See application file for complete search history.

(56) References Cited

U.S. PATENT DOCUMENTS

| | | |
|---|---|---|
| 666,223 A | 1/1901 | Shedlock |
| 4,581,634 A | 4/1986 | Williams |

(Continued)

FOREIGN PATENT DOCUMENTS

| | | |
|---|---|---|
| CA | 2887596 A1 | 7/2015 |
| EP | 2051480 A1 | 4/2009 |

(Continued)

OTHER PUBLICATIONS

"A Whole New Story", Snap, Inc., [Online] Retrieved from the Internet: <URL: https://www.snap.com/en-US/news/>, (2017), 13 pgs.

(Continued)

*Primary Examiner* — William P Bartlett
(74) *Attorney, Agent, or Firm* — Schwegman Lundberg & 1Woessner, P.A.

(57) ABSTRACT

In other embodiments, a method to perform image-based searching may include receiving a group of images from a content owner; creating an index using the group of images; receiving a further image from a mobile computing device of a user; determining a correlation between the further image and the index; and/or directing the mobile computing device of the user to content of the content owner, responsive to the determining of the correlation.

18 Claims, 17 Drawing Sheets

Related U.S. Application Data

(60) Provisional application No. 62/264,549, filed on Dec. 8, 2015.

(51) Int. Cl.

| | |
|---|---|
| *G06F 16/51* | (2019.01) |
| *G06F 16/58* | (2019.01) |
| *G06F 16/583* | (2019.01) |
| *G06F 16/587* | (2019.01) |
| *G11B 27/11* | (2006.01) |
| *G11B 27/34* | (2006.01) |

(52) U.S. Cl.
CPC ............ *G06F 16/587* (2019.01); *G11B 27/11* (2013.01); *G11B 27/34* (2013.01); *G06F 3/167* (2013.01)

(56) References Cited

U.S. PATENT DOCUMENTS

| | | | |
|---|---|---|---|
| 4,975,690 A | 12/1990 | Torres | |
| 5,072,412 A | 12/1991 | Henderson, Jr. et al. | |
| 5,493,692 A | 2/1996 | Theimer et al. | |
| 5,713,073 A | 1/1998 | Warsta | |
| 5,754,939 A | 5/1998 | Herz et al. | |
| 5,855,008 A | 12/1998 | Goldhaber et al. | |
| 5,883,639 A | 3/1999 | Walton et al. | |
| 5,999,932 A | 12/1999 | Paul | |
| 6,012,098 A | 1/2000 | Bayeh et al. | |
| 6,014,090 A | 1/2000 | Rosen et al. | |
| 6,029,141 A | 2/2000 | Bezos et al. | |
| 6,038,295 A | 3/2000 | Mattes | |
| 6,049,711 A | 4/2000 | Yehezkel et al. | |
| 6,154,764 A | 11/2000 | Nitta et al. | |
| 6,158,044 A | 12/2000 | Tibbetts | |
| 6,167,435 A | 12/2000 | Druckenmiller et al. | |
| 6,204,840 B1 | 3/2001 | Petelycky et al. | |
| 6,205,432 B1 | 3/2001 | Gabbard et al. | |
| 6,216,141 B1 | 4/2001 | Straub et al. | |
| 6,285,381 B1 | 9/2001 | Sawano et al. | |
| 6,285,987 B1 | 9/2001 | Roth et al. | |
| 6,310,694 B1 | 10/2001 | Okimoto et al. | |
| 6,317,789 B1 | 11/2001 | Rakavy et al. | |
| 6,323,761 B1 | 11/2001 | Son | |
| 6,334,149 B1 | 12/2001 | Davis, Jr. et al. | |
| 6,349,203 B1 | 2/2002 | Asaoka et al. | |
| 6,353,170 B1 | 3/2002 | Eyzaguirre et al. | |
| 6,446,004 B1 | 9/2002 | Cao et al. | |
| 6,449,657 B2 | 9/2002 | Stanbach et al. | |
| 6,456,852 B2 | 9/2002 | Bar et al. | |
| 6,481,625 B2 | 11/2002 | Lucera et al. | |
| 6,484,196 B1 | 11/2002 | Maurille | |
| 6,487,586 B2 | 11/2002 | Ogilvie et al. | |
| 6,487,601 B1 | 11/2002 | Hubacher et al. | |
| 6,523,008 B1 | 2/2003 | Avrunin | |
| 6,542,749 B2 | 4/2003 | Tanaka et al. | |
| 6,549,768 B1 | 4/2003 | Fraccaroli | |
| 6,618,593 B1 | 9/2003 | Drutman et al. | |
| 6,622,174 B1 | 9/2003 | Ukita et al. | |
| 6,631,463 B1 | 10/2003 | Floyd et al. | |
| 6,636,247 B1 | 10/2003 | Hamzy et al. | |
| 6,636,855 B2 | 10/2003 | Holloway et al. | |
| 6,643,684 B1 | 11/2003 | Malkin et al. | |
| 6,658,095 B1 | 12/2003 | Yoakum et al. | |
| 6,665,531 B1 | 12/2003 | Soderbacka et al. | |
| 6,668,173 B2 | 12/2003 | Greene | |
| 6,684,238 B1 | 1/2004 | Dutta | |
| 6,684,257 B1 | 1/2004 | Camut et al. | |
| 6,698,020 B1 | 2/2004 | Zigmond et al. | |
| 6,700,506 B1 | 3/2004 | Winkler | |
| 6,701,347 B1 | 3/2004 | Ogilvie | |
| 6,711,608 B1 | 3/2004 | Ogilvie | |
| 6,720,860 B1 | 4/2004 | Narayanaswami | |
| 6,724,403 B1 | 4/2004 | Santoro et al. | |
| 6,757,713 B1 | 6/2004 | Ogilvie et al. | |
| 6,832,222 B1 | 12/2004 | Zimowski | |
| 6,834,195 B2 | 12/2004 | Brandenberg et al. | |
| 6,836,792 B1 | 12/2004 | Chen | |
| 6,898,626 B2 | 5/2005 | Ohashi | |
| 6,959,324 B1 | 10/2005 | Kubik et al. | |
| 6,963,659 B2 | 11/2005 | Tumey et al. | |
| 6,970,088 B2 | 11/2005 | Kovach | |
| 6,970,907 B1 | 11/2005 | Ullmann et al. | |
| 6,980,909 B2 | 12/2005 | Root et al. | |
| 6,981,040 B1 | 12/2005 | Konig et al. | |
| 7,020,494 B2 | 3/2006 | Spriestersbach et al. | |
| 7,027,124 B2 | 4/2006 | Foote et al. | |
| 7,072,963 B2 | 7/2006 | Anderson et al. | |
| 7,085,571 B2 | 8/2006 | Kalhan et al. | |
| 7,110,744 B2 | 9/2006 | Freeny, Jr. | |
| 7,124,164 B1 | 10/2006 | Chemtob | |
| 7,149,893 B1 | 12/2006 | Leonard et al. | |
| 7,173,651 B1 | 2/2007 | Knowles | |
| 7,188,143 B2 | 3/2007 | Szeto | |
| 7,203,380 B2 | 4/2007 | Chiu et al. | |
| 7,206,568 B2 | 4/2007 | Sudit | |
| 7,227,937 B1 | 6/2007 | Yoakum et al. | |
| 7,237,002 B1 | 6/2007 | Estrada et al. | |
| 7,240,089 B2 | 7/2007 | Boudreau | |
| 7,243,163 B1 | 7/2007 | Friend et al. | |
| 7,269,426 B2 | 9/2007 | Kokkonen et al. | |
| 7,278,168 B1 | 10/2007 | Chaudhury et al. | |
| 7,280,658 B2 | 10/2007 | Amini et al. | |
| 7,315,823 B2 | 1/2008 | Brondrup | |
| 7,349,768 B2 | 3/2008 | Bruce et al. | |
| 7,356,564 B2 | 4/2008 | Hartselle et al. | |
| 7,376,715 B2 | 5/2008 | Cunningham et al. | |
| 7,394,345 B1 | 7/2008 | Ehlinger et al. | |
| 7,411,493 B2 | 8/2008 | Smith | |
| 7,423,580 B2 | 9/2008 | Markhovsky et al. | |
| 7,454,442 B2 | 11/2008 | Cobleigh et al. | |
| 7,478,402 B2 | 1/2009 | Christensen et al. | |
| 7,496,347 B2 | 2/2009 | Puranik | |
| 7,508,419 B2 | 3/2009 | Toyama et al. | |
| 7,519,670 B2 | 4/2009 | Hagale et al. | |
| 7,535,890 B2 | 5/2009 | Rojas | |
| 7,546,554 B2 | 6/2009 | Chiu et al. | |
| 7,607,096 B2 | 10/2009 | Oreizy et al. | |
| 7,639,943 B1 | 12/2009 | Kalajan | |
| 7,650,231 B2 | 1/2010 | Gadler | |
| 7,668,537 B2 | 2/2010 | DeVries | |
| 7,703,140 B2 | 4/2010 | Nath et al. | |
| 7,753,269 B2 | 7/2010 | Russell et al. | |
| 7,770,137 B2 | 8/2010 | Forbes et al. | |
| 7,778,973 B2 | 8/2010 | Choi | |
| 7,779,444 B2 | 8/2010 | Glad | |
| 7,787,886 B2 | 8/2010 | Markhovsky et al. | |
| 7,796,946 B2 | 9/2010 | Eisenbach | |
| 7,801,954 B2 | 9/2010 | Cadiz et al. | |
| 7,856,360 B2 | 12/2010 | Kramer et al. | |
| 7,912,896 B2 | 3/2011 | Wolovitz et al. | |
| 8,001,204 B2 | 8/2011 | Burtner et al. | |
| 8,032,586 B2 | 10/2011 | Challenger et al. | |
| 8,082,255 B1 | 12/2011 | Carlson, Jr. et al. | |
| 8,090,351 B2 | 1/2012 | Klein | |
| 8,098,904 B2 | 1/2012 | Ioffe et al. | |
| 8,099,109 B2 | 1/2012 | Altman et al. | |
| 8,112,716 B2 | 2/2012 | Kobayashi | |
| 8,131,597 B2 | 3/2012 | Hudetz | |
| 8,135,166 B2 | 3/2012 | Rhoads | |
| 8,136,028 B1 | 3/2012 | Loeb et al. | |
| 8,146,001 B1 | 3/2012 | Reese | |
| 8,155,329 B1 | 4/2012 | Silaika | |
| 8,161,115 B2 | 4/2012 | Yamamoto | |
| 8,161,417 B1 | 4/2012 | Lee | |
| 8,170,957 B2 | 5/2012 | Richard | |
| 8,195,203 B1 | 6/2012 | Tseng | |
| 8,199,747 B2 | 6/2012 | Rojas et al. | |
| 8,208,943 B2 | 6/2012 | Petersen | |
| 8,214,443 B2 | 7/2012 | Hamburg | |
| 8,234,350 B1 | 7/2012 | Gu et al. | |
| 8,238,947 B2 | 8/2012 | Lottin et al. | |
| 8,244,593 B2 | 8/2012 | Klinger et al. | |
| 8,276,092 B1 | 9/2012 | Narayanan et al. | |

(56)　　　　　　References Cited

U.S. PATENT DOCUMENTS

| | | |
|---|---|---|
| 8,279,319 B2 | 10/2012 | Date |
| 8,280,406 B2 | 10/2012 | Ziskind et al. |
| 8,285,199 B2 | 10/2012 | Hsu et al. |
| 8,287,380 B2 | 10/2012 | Nguyen et al. |
| 8,301,159 B2 | 10/2012 | Hamynen et al. |
| 8,306,922 B1 | 11/2012 | Kunal et al. |
| 8,312,086 B2 | 11/2012 | Velusamy et al. |
| 8,312,097 B1 | 11/2012 | Siegel et al. |
| 8,326,315 B2 | 12/2012 | Phillips et al. |
| 8,326,327 B2 | 12/2012 | Hymel et al. |
| 8,332,475 B2 | 12/2012 | Rosen et al. |
| 8,352,546 B1 | 1/2013 | Dollard |
| 8,379,130 B2 | 2/2013 | Forutanpour et al. |
| 8,385,950 B1 | 2/2013 | Wagner et al. |
| 8,402,097 B2 | 3/2013 | Szeto |
| 8,405,773 B2 | 3/2013 | Hayashi et al. |
| 8,418,067 B2 | 4/2013 | Cheng et al. |
| 8,423,409 B2 | 4/2013 | Rao |
| 8,471,914 B2 | 6/2013 | Sakiyama et al. |
| 8,472,664 B1 * | 6/2013 | Jing .................... G01C 21/20 |
| | | 382/305 |
| 8,472,935 B1 | 6/2013 | Fujisaki |
| 8,489,115 B2 | 7/2013 | Rodriguez |
| 8,510,383 B2 | 8/2013 | Hurley et al. |
| 8,527,345 B2 | 9/2013 | Rothschild et al. |
| 8,554,627 B2 | 10/2013 | Svendsen et al. |
| 8,560,612 B2 | 10/2013 | Kilmer et al. |
| 8,570,907 B2 | 10/2013 | Garcia, Jr. et al. |
| 8,594,680 B2 | 11/2013 | Ledlie et al. |
| 8,613,089 B1 | 12/2013 | Holloway et al. |
| 8,660,358 B1 | 2/2014 | Bergboer et al. |
| 8,660,369 B2 | 2/2014 | Llano et al. |
| 8,660,793 B2 | 2/2014 | Ngo et al. |
| 8,682,350 B2 | 3/2014 | Altman et al. |
| 8,718,333 B2 | 5/2014 | Wolf et al. |
| 8,724,622 B2 | 5/2014 | Rojas |
| 8,732,168 B2 | 5/2014 | Johnson |
| 8,744,523 B2 | 6/2014 | Fan et al. |
| 8,745,132 B2 | 6/2014 | Obradovich |
| 8,761,800 B2 | 6/2014 | Kuwahara |
| 8,768,876 B2 | 7/2014 | Shim et al. |
| 8,775,972 B2 | 7/2014 | Spiegel |
| 8,788,680 B1 | 7/2014 | Naik |
| 8,790,187 B2 | 7/2014 | Walker et al. |
| 8,793,274 B2 | 7/2014 | Yu et al. |
| 8,797,415 B2 | 8/2014 | Arnold |
| 8,798,646 B1 | 8/2014 | Wang et al. |
| 8,819,035 B2 | 8/2014 | Boetje |
| 8,850,490 B1 | 9/2014 | Thomas et al. |
| 8,856,349 B2 | 10/2014 | Jain et al. |
| 8,868,223 B1 | 10/2014 | Sharifi |
| 8,874,677 B2 | 10/2014 | Rosen et al. |
| 8,886,227 B2 | 11/2014 | Schmidt et al. |
| 8,892,588 B2 | 11/2014 | Bennett |
| 8,909,679 B2 | 12/2014 | Root et al. |
| 8,909,714 B2 | 12/2014 | Agarwal et al. |
| 8,909,725 B1 | 12/2014 | Sehn |
| 8,913,285 B1 | 12/2014 | Neubrand |
| 8,914,752 B1 | 12/2014 | Spiegel |
| 8,924,890 B2 | 12/2014 | Begeja et al. |
| 8,972,357 B2 | 3/2015 | Shim et al. |
| 8,995,433 B2 | 3/2015 | Rojas |
| 9,015,285 B1 | 4/2015 | Ebsen et al. |
| 9,020,745 B2 | 4/2015 | Johnston et al. |
| 9,040,574 B2 | 5/2015 | Wang et al. |
| 9,055,416 B2 | 6/2015 | Rosen et al. |
| 9,083,770 B1 | 7/2015 | Drose et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,119,027 B2 | 8/2015 | Sharon et al. |
| 9,123,074 B2 | 9/2015 | Jacobs et al. |
| 9,143,382 B2 | 9/2015 | Bhogal et al. |
| 9,143,681 B1 | 9/2015 | Ebsen et al. |
| 9,148,424 B1 | 9/2015 | Yang |
| 9,152,477 B1 | 10/2015 | Campbell et al. |
| 9,191,776 B2 | 11/2015 | Root et al. |
| 9,204,252 B2 | 12/2015 | Root |
| 9,225,805 B2 | 12/2015 | Kujawa et al. |
| 9,225,897 B1 | 12/2015 | Sehn et al. |
| 9,237,202 B1 | 1/2016 | Sehn |
| 9,258,459 B2 | 2/2016 | Hartley |
| 9,264,463 B2 | 2/2016 | Rubinstein et al. |
| 9,264,485 B1 | 2/2016 | Ranganathan et al. |
| 9,276,886 B2 | 3/2016 | Samaranayake |
| 9,294,425 B1 | 3/2016 | Son |
| 9,344,606 B2 | 5/2016 | Hartley et al. |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,430,783 B1 | 8/2016 | Sehn |
| 9,439,041 B2 | 9/2016 | Parvizi et al. |
| 9,443,227 B2 | 9/2016 | Evans et al. |
| 9,443,270 B1 | 9/2016 | Friedman et al. |
| 9,450,907 B2 | 9/2016 | Pridmore et al. |
| 9,459,778 B2 | 10/2016 | Hogeg et al. |
| 9,482,882 B1 | 11/2016 | Hanover et al. |
| 9,482,883 B1 | 11/2016 | Meisenholder |
| 9,489,661 B2 | 11/2016 | Evans et al. |
| 9,491,134 B2 | 11/2016 | Rosen et al. |
| 9,532,171 B2 | 12/2016 | Allen et al. |
| 9,537,811 B2 | 1/2017 | Allen et al. |
| 9,560,006 B2 | 1/2017 | Prado et al. |
| 9,628,950 B1 | 4/2017 | Noeth et al. |
| 9,652,896 B1 | 5/2017 | Jurgenson et al. |
| 9,659,244 B2 | 5/2017 | Anderton et al. |
| 9,665,799 B1 | 5/2017 | Munteanu et al. |
| 9,693,191 B2 | 6/2017 | Sehn |
| 9,705,831 B2 | 7/2017 | Spiegel |
| 9,710,821 B2 | 7/2017 | Heath |
| 9,742,713 B2 | 8/2017 | Spiegel et al. |
| 9,785,796 B1 | 10/2017 | Murphy et al. |
| 9,825,898 B2 | 11/2017 | Sehn |
| 9,854,219 B2 | 12/2017 | Sehn |
| 9,961,520 B2 | 5/2018 | Brooks et al. |
| 10,157,333 B1 | 12/2018 | Wang et al. |
| 10,674,311 B1 | 6/2020 | Bouba et al. |
| 10,678,849 B1 | 6/2020 | Ouimet et al. |
| 10,893,385 B1 | 1/2021 | Berardino et al. |
| 10,936,066 B1 | 3/2021 | Jaureguiberry et al. |
| 10,939,246 B1 | 3/2021 | Dancie et al. |
| 10,945,098 B2 | 3/2021 | Dancie et al. |
| 10,956,793 B1 | 3/2021 | Wang et al. |
| 11,032,670 B1 | 6/2021 | Baylin et al. |
| 11,039,270 B2 | 6/2021 | Bouba et al. |
| 11,166,123 B1 | 11/2021 | Guillaume |
| 11,275,439 B2 | 3/2022 | Jaureguiberry et al. |
| 11,294,936 B1 | 4/2022 | Jaureguiberry |
| 11,307,747 B2 | 4/2022 | Dancie et al. |
| 11,630,974 B2 | 4/2023 | Ouimet et al. |
| 11,822,600 B2 | 11/2023 | Wang et al. |
| 12,216,702 B1 | 2/2025 | Ouimet et al. |
| 12,411,890 B2 | 9/2025 | Ouimet et al. |
| 2002/0019979 A1 | 2/2002 | Koreeda et al. |
| 2002/0047868 A1 | 4/2002 | Miyazawa |
| 2002/0078456 A1 | 6/2002 | Hudson et al. |
| 2002/0087631 A1 | 7/2002 | Sharma |
| 2002/0097257 A1 | 7/2002 | Miller et al. |
| 2002/0118195 A1 | 8/2002 | Paetzold et al. |
| 2002/0122659 A1 | 9/2002 | Mcgrath et al. |
| 2002/0128047 A1 | 9/2002 | Gates |
| 2002/0144154 A1 | 10/2002 | Tomkow |
| 2003/0001846 A1 | 1/2003 | Davis et al. |
| 2003/0016247 A1 | 1/2003 | Lai et al. |
| 2003/0017823 A1 | 1/2003 | Mager et al. |
| 2003/0020623 A1 | 1/2003 | Cao et al. |
| 2003/0023874 A1 | 1/2003 | Prokupets et al. |
| 2003/0037124 A1 | 2/2003 | Yamaura et al. |
| 2003/0052925 A1 | 3/2003 | Daimon et al. |
| 2003/0101230 A1 | 5/2003 | Benschoter et al. |
| 2003/0110503 A1 | 6/2003 | Perkes |
| 2003/0126215 A1 | 7/2003 | Udell |

(56) References Cited

U.S. PATENT DOCUMENTS

| | | |
|---|---|---|
| 2003/0148773 A1 | 8/2003 | Spriestersbach et al. |
| 2003/0164856 A1 | 9/2003 | Prager et al. |
| 2003/0217106 A1 | 11/2003 | Adar et al. |
| 2003/0224776 A1 | 12/2003 | Meng |
| 2003/0229607 A1 | 12/2003 | Zellweger et al. |
| 2004/0010516 A1 | 1/2004 | Meng |
| 2004/0027371 A1 | 2/2004 | Jaeger |
| 2004/0064429 A1 | 4/2004 | Hirstius et al. |
| 2004/0078367 A1 | 4/2004 | Anderson et al. |
| 2004/0111467 A1 | 6/2004 | Willis |
| 2004/0158739 A1 | 8/2004 | Wakai et al. |
| 2004/0189465 A1 | 9/2004 | Capobianco et al. |
| 2004/0203959 A1 | 10/2004 | Coombes |
| 2004/0215625 A1 | 10/2004 | Svendsen et al. |
| 2004/0243531 A1 | 12/2004 | Dean |
| 2004/0243688 A1 | 12/2004 | Wugofski |
| 2005/0021444 A1 | 1/2005 | Bauer et al. |
| 2005/0022211 A1 | 1/2005 | Veselov et al. |
| 2005/0048989 A1 | 3/2005 | Jung |
| 2005/0060299 A1 | 3/2005 | Filley et al. |
| 2005/0078804 A1 | 4/2005 | Yomoda |
| 2005/0097176 A1 | 5/2005 | Schatz et al. |
| 2005/0102381 A1 | 5/2005 | Jiang et al. |
| 2005/0104976 A1 | 5/2005 | Currans |
| 2005/0114783 A1 | 5/2005 | Szeto |
| 2005/0119936 A1 | 6/2005 | Buchanan et al. |
| 2005/0122405 A1 | 6/2005 | Voss et al. |
| 2005/0193340 A1 | 9/2005 | Amburgey et al. |
| 2005/0193345 A1 | 9/2005 | Klassen et al. |
| 2005/0198128 A1 | 9/2005 | Anderson |
| 2005/0223066 A1 | 10/2005 | Buchheit et al. |
| 2005/0288954 A1 | 12/2005 | McCarthy et al. |
| 2006/0026067 A1 | 2/2006 | Nicholas et al. |
| 2006/0107297 A1 | 5/2006 | Toyama et al. |
| 2006/0114338 A1 | 6/2006 | Rothschild |
| 2006/0119882 A1 | 6/2006 | Harris et al. |
| 2006/0184538 A1 | 8/2006 | Randall et al. |
| 2006/0242239 A1 | 10/2006 | Morishima et al. |
| 2006/0249588 A1 | 11/2006 | Walmsley et al. |
| 2006/0252438 A1 | 11/2006 | Ansamaa et al. |
| 2006/0253462 A1 | 11/2006 | Gras |
| 2006/0265417 A1 | 11/2006 | Amato et al. |
| 2006/0270419 A1 | 11/2006 | Crowley et al. |
| 2006/0287878 A1 | 12/2006 | Wadhwa et al. |
| 2007/0004426 A1 | 1/2007 | Pfleging et al. |
| 2007/0038715 A1 | 2/2007 | Collins et al. |
| 2007/0040931 A1 | 2/2007 | Nishizawa |
| 2007/0064899 A1 | 3/2007 | Boss et al. |
| 2007/0073517 A1 | 3/2007 | Panje |
| 2007/0073823 A1 | 3/2007 | Cohen et al. |
| 2007/0075898 A1 | 4/2007 | Markhovsky et al. |
| 2007/0082707 A1 | 4/2007 | Flynt et al. |
| 2007/0136228 A1 | 6/2007 | Petersen |
| 2007/0192128 A1 | 8/2007 | Celestini |
| 2007/0198340 A1 | 8/2007 | Lucovsky et al. |
| 2007/0198495 A1 | 8/2007 | Buron et al. |
| 2007/0208751 A1 | 9/2007 | Cowan et al. |
| 2007/0210936 A1 | 9/2007 | Nicholson |
| 2007/0214180 A1 | 9/2007 | Crawford |
| 2007/0214216 A1 | 9/2007 | Carrer et al. |
| 2007/0233556 A1 | 10/2007 | Koningstein |
| 2007/0233801 A1 | 10/2007 | Eren et al. |
| 2007/0233859 A1 | 10/2007 | Zhao et al. |
| 2007/0243887 A1 | 10/2007 | Bandhole et al. |
| 2007/0244750 A1 | 10/2007 | Grannan et al. |
| 2007/0255456 A1 | 11/2007 | Funayama |
| 2007/0281690 A1 | 12/2007 | Altman et al. |
| 2008/0002864 A1 | 1/2008 | Das et al. |
| 2008/0005105 A1 | 1/2008 | Lawler et al. |
| 2008/0022329 A1 | 1/2008 | Glad |
| 2008/0025701 A1 | 1/2008 | Ikeda |
| 2008/0032703 A1 | 2/2008 | Krumm et al. |
| 2008/0033930 A1 | 2/2008 | Warren |
| 2008/0043041 A2 | 2/2008 | Hedenstroem et al. |
| 2008/0049704 A1 | 2/2008 | Witteman et al. |
| 2008/0055269 A1 | 3/2008 | Lemay et al. |
| 2008/0062141 A1 | 3/2008 | Chandhri |
| 2008/0076505 A1 | 3/2008 | Ngyen et al. |
| 2008/0092233 A1 | 4/2008 | Tian et al. |
| 2008/0094387 A1 | 4/2008 | Chen |
| 2008/0104503 A1 | 5/2008 | Beall et al. |
| 2008/0109844 A1 | 5/2008 | Baldeschweiler et al. |
| 2008/0120409 A1 | 5/2008 | Sun et al. |
| 2008/0147730 A1 | 6/2008 | Lee et al. |
| 2008/0148150 A1 | 6/2008 | Mall |
| 2008/0158230 A1 | 7/2008 | Sharma et al. |
| 2008/0168033 A1 | 7/2008 | Ott et al. |
| 2008/0168489 A1 | 7/2008 | Schraga |
| 2008/0189177 A1 | 8/2008 | Anderton et al. |
| 2008/0207176 A1 | 8/2008 | Brackbill et al. |
| 2008/0208692 A1 | 8/2008 | Garaventi et al. |
| 2008/0214210 A1 | 9/2008 | Rasanen et al. |
| 2008/0222545 A1 | 9/2008 | Lemay |
| 2008/0255976 A1 | 10/2008 | Altberg et al. |
| 2008/0256446 A1 | 10/2008 | Yamamoto |
| 2008/0256577 A1 | 10/2008 | Funaki et al. |
| 2008/0266421 A1 | 10/2008 | Takahata et al. |
| 2008/0270938 A1 | 10/2008 | Carlson |
| 2008/0288338 A1 | 11/2008 | Wiseman et al. |
| 2008/0303833 A1 | 12/2008 | Swift et al. |
| 2008/0306826 A1 | 12/2008 | Kramer et al. |
| 2008/0313172 A1 | 12/2008 | King et al. |
| 2008/0313329 A1 | 12/2008 | Wang et al. |
| 2008/0313346 A1 | 12/2008 | Kujawa et al. |
| 2008/0318616 A1 | 12/2008 | Chipalkatti et al. |
| 2009/0006191 A1 | 1/2009 | Arankalle et al. |
| 2009/0006565 A1 | 1/2009 | Velusamy et al. |
| 2009/0012940 A1 | 1/2009 | Ives et al. |
| 2009/0015703 A1 | 1/2009 | Kim et al. |
| 2009/0016532 A1 | 1/2009 | Baldischweiler |
| 2009/0024956 A1 | 1/2009 | Kobayashi |
| 2009/0030774 A1 | 1/2009 | Rothschild et al. |
| 2009/0030999 A1 | 1/2009 | Gatzke et al. |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0079846 A1 | 3/2009 | Chou |
| 2009/0089678 A1 | 4/2009 | Sacco et al. |
| 2009/0089710 A1 | 4/2009 | Wood et al. |
| 2009/0093261 A1 | 4/2009 | Ziskind |
| 2009/0113305 A1 | 4/2009 | Graif et al. |
| 2009/0132341 A1 | 5/2009 | Klinger |
| 2009/0132453 A1 | 5/2009 | Hangartner et al. |
| 2009/0132665 A1 | 5/2009 | Thomsen et al. |
| 2009/0148045 A1 | 6/2009 | Lee et al. |
| 2009/0153492 A1 | 6/2009 | Popp |
| 2009/0157450 A1 | 6/2009 | Athsani et al. |
| 2009/0157752 A1 | 6/2009 | Gonzalez |
| 2009/0160970 A1 | 6/2009 | Fredlund et al. |
| 2009/0163182 A1 | 6/2009 | Gatti et al. |
| 2009/0177299 A1 | 7/2009 | Van De Sluis |
| 2009/0177665 A1 | 7/2009 | Callery et al. |
| 2009/0192900 A1 | 7/2009 | Collision |
| 2009/0199242 A1 | 8/2009 | Johnson et al. |
| 2009/0215469 A1 | 8/2009 | Fisher et al. |
| 2009/0232354 A1 | 9/2009 | Camp, Jr. et al. |
| 2009/0234815 A1 | 9/2009 | Boerries et al. |
| 2009/0239552 A1 | 9/2009 | Churchill et al. |
| 2009/0249222 A1 | 10/2009 | Schmidt et al. |
| 2009/0249244 A1 | 10/2009 | Robinson et al. |
| 2009/0265647 A1 | 10/2009 | Martin et al. |
| 2009/0288022 A1 | 11/2009 | Almstrand et al. |
| 2009/0291672 A1 | 11/2009 | Treves et al. |
| 2009/0292608 A1 | 11/2009 | Polachek |
| 2009/0319607 A1 | 12/2009 | Belz et al. |
| 2009/0327073 A1 | 12/2009 | Li |
| 2010/0009700 A1 | 1/2010 | Camp, Jr. et al. |
| 2010/0062794 A1 | 3/2010 | Han |
| 2010/0082427 A1 | 4/2010 | Burgener et al. |
| 2010/0082693 A1 | 4/2010 | Hugg et al. |
| 2010/0100568 A1 | 4/2010 | Papin et al. |
| 2010/0113065 A1 | 5/2010 | Narayan et al. |
| 2010/0114876 A1 | 5/2010 | Mandel et al. |
| 2010/0130233 A1 | 5/2010 | Parker |

(56) References Cited

U.S. PATENT DOCUMENTS

| | | |
|---|---|---|
| 2010/0131880 A1 | 5/2010 | Lee et al. |
| 2010/0131895 A1 | 5/2010 | Wohlert |
| 2010/0153144 A1 | 6/2010 | Miller et al. |
| 2010/0159944 A1 | 6/2010 | Pascal et al. |
| 2010/0161658 A1 | 6/2010 | Hamynen et al. |
| 2010/0161831 A1 | 6/2010 | Haas et al. |
| 2010/0162149 A1 | 6/2010 | Sheleheda et al. |
| 2010/0183280 A1 | 7/2010 | Beauregard et al. |
| 2010/0185552 A1 | 7/2010 | Deluca et al. |
| 2010/0185665 A1 | 7/2010 | Horn et al. |
| 2010/0191631 A1 | 7/2010 | Weidmann |
| 2010/0197318 A1 | 8/2010 | Petersen et al. |
| 2010/0197319 A1 | 8/2010 | Petersen et al. |
| 2010/0198683 A1 | 8/2010 | Aarabi |
| 2010/0198694 A1 | 8/2010 | Muthukrishnan |
| 2010/0198826 A1 | 8/2010 | Petersen et al. |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0201482 A1 | 8/2010 | Robertson et al. |
| 2010/0201536 A1 | 8/2010 | Robertson et al. |
| 2010/0214436 A1 | 8/2010 | Kim et al. |
| 2010/0214936 A1 | 8/2010 | Ito et al. |
| 2010/0223128 A1 | 9/2010 | Dukellis et al. |
| 2010/0223343 A1 | 9/2010 | Bosan et al. |
| 2010/0250109 A1 | 9/2010 | Johnston et al. |
| 2010/0257196 A1 | 10/2010 | Waters et al. |
| 2010/0259386 A1 | 10/2010 | Holley et al. |
| 2010/0273509 A1 | 10/2010 | Sweeney et al. |
| 2010/0281045 A1 | 11/2010 | Dean |
| 2010/0293173 A1 | 11/2010 | Chapin et al. |
| 2010/0306193 A1 | 12/2010 | Pereira et al. |
| 2010/0306669 A1 | 12/2010 | Della Pasqua |
| 2011/0004071 A1 | 1/2011 | Faiola et al. |
| 2011/0010205 A1 | 1/2011 | Richards |
| 2011/0029512 A1 | 2/2011 | Folgner et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0061028 A1 | 3/2011 | Bachman et al. |
| 2011/0064388 A1 | 3/2011 | Brown et al. |
| 2011/0066743 A1 | 3/2011 | Hurley et al. |
| 2011/0083101 A1 | 4/2011 | Sharon et al. |
| 2011/0099507 A1 | 4/2011 | Nesladek et al. |
| 2011/0102630 A1 | 5/2011 | Rukes |
| 2011/0119133 A1 | 5/2011 | Igelman et al. |
| 2011/0137881 A1 | 6/2011 | Cheng et al. |
| 2011/0145564 A1 | 6/2011 | Moshir et al. |
| 2011/0159890 A1 | 6/2011 | Fortescue et al. |
| 2011/0164163 A1 | 7/2011 | Bilbrey et al. |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0215966 A1 | 9/2011 | Kim et al. |
| 2011/0225048 A1 | 9/2011 | Nair |
| 2011/0238763 A1 | 9/2011 | Shin et al. |
| 2011/0255736 A1 | 10/2011 | Thompson et al. |
| 2011/0273575 A1 | 11/2011 | Lee |
| 2011/0282508 A1 | 11/2011 | Goutard et al. |
| 2011/0282799 A1 | 11/2011 | Huston |
| 2011/0282906 A1 | 11/2011 | Wong |
| 2011/0283188 A1 | 11/2011 | Farrenkopf |
| 2011/0286586 A1 | 11/2011 | Saylor et al. |
| 2011/0314419 A1 | 12/2011 | Dunn et al. |
| 2011/0320202 A1 | 12/2011 | Kaufman |
| 2011/0320373 A1 | 12/2011 | Lee et al. |
| 2012/0028659 A1 | 2/2012 | Whitney et al. |
| 2012/0033718 A1 | 2/2012 | Kauffman et al. |
| 2012/0036015 A1 | 2/2012 | Sheikh |
| 2012/0036443 A1 | 2/2012 | Ohmori et al. |
| 2012/0054797 A1 | 3/2012 | Skog et al. |
| 2012/0059722 A1 | 3/2012 | Rao |
| 2012/0062805 A1 | 3/2012 | Candelore |
| 2012/0078936 A1 | 3/2012 | Kuo et al. |
| 2012/0084731 A1 | 4/2012 | Filman et al. |
| 2012/0084835 A1 | 4/2012 | Thomas et al. |
| 2012/0099800 A1 | 4/2012 | Llano et al. |
| 2012/0108293 A1 | 5/2012 | Law et al. |
| 2012/0110096 A1 | 5/2012 | Smarr et al. |
| 2012/0112995 A1 | 5/2012 | Maeda |
| 2012/0113143 A1 | 5/2012 | Adhikari et al. |
| 2012/0113272 A1 | 5/2012 | Hata |
| 2012/0123830 A1 | 5/2012 | Svendsen et al. |
| 2012/0123871 A1 | 5/2012 | Svendsen et al. |
| 2012/0123875 A1 | 5/2012 | Svendsen et al. |
| 2012/0124126 A1 | 5/2012 | Alcazar et al. |
| 2012/0124176 A1 | 5/2012 | Curtis et al. |
| 2012/0124458 A1 | 5/2012 | Cruzada |
| 2012/0131507 A1 | 5/2012 | Sparandara et al. |
| 2012/0131512 A1 | 5/2012 | Takeuchi et al. |
| 2012/0143760 A1 | 6/2012 | Abulafia et al. |
| 2012/0150978 A1 | 6/2012 | Monaco |
| 2012/0165100 A1 | 6/2012 | Lalancette et al. |
| 2012/0166472 A1 | 6/2012 | Hoppenot et al. |
| 2012/0166971 A1 | 6/2012 | Sachson et al. |
| 2012/0169855 A1 | 7/2012 | Oh |
| 2012/0172062 A1 | 7/2012 | Altman et al. |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0197724 A1 | 8/2012 | Kendall |
| 2012/0200743 A1 | 8/2012 | Blanchflower et al. |
| 2012/0203761 A1 | 8/2012 | Biran et al. |
| 2012/0209921 A1 | 8/2012 | Adafin et al. |
| 2012/0209924 A1 | 8/2012 | Evans et al. |
| 2012/0210244 A1 | 8/2012 | De Francisco Lopez et al. |
| 2012/0212632 A1 | 8/2012 | Mate et al. |
| 2012/0220264 A1 | 8/2012 | Kawabata |
| 2012/0226748 A1 | 9/2012 | Bosworth et al. |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0250951 A1 | 10/2012 | Chen |
| 2012/0252418 A1 | 10/2012 | Kandekar et al. |
| 2012/0254325 A1 | 10/2012 | Majeti et al. |
| 2012/0278387 A1 | 11/2012 | Garcia et al. |
| 2012/0278692 A1 | 11/2012 | Shi |
| 2012/0290637 A1 | 11/2012 | Perantatos et al. |
| 2012/0294520 A1 | 11/2012 | Mei et al. |
| 2012/0299954 A1 | 11/2012 | Wada et al. |
| 2012/0304052 A1 | 11/2012 | Tanaka et al. |
| 2012/0304080 A1 | 11/2012 | Wormald et al. |
| 2012/0307096 A1 | 12/2012 | Ford et al. |
| 2012/0307112 A1 | 12/2012 | Kunishige et al. |
| 2012/0319904 A1 | 12/2012 | Lee et al. |
| 2012/0323933 A1 | 12/2012 | He et al. |
| 2012/0324018 A1 | 12/2012 | Metcalf et al. |
| 2013/0006759 A1 | 1/2013 | Srivastava et al. |
| 2013/0024757 A1 | 1/2013 | Doll et al. |
| 2013/0036364 A1 | 2/2013 | Johnson |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0073280 A1 | 3/2013 | O'Neil et al. |
| 2013/0073568 A1 | 3/2013 | Federov et al. |
| 2013/0073632 A1 | 3/2013 | Fedorov et al. |
| 2013/0073979 A1 | 3/2013 | Shepherd et al. |
| 2013/0073983 A1 | 3/2013 | Rasmussen et al. |
| 2013/0080254 A1 | 3/2013 | Thramann |
| 2013/0085790 A1 | 4/2013 | Palmer et al. |
| 2013/0086072 A1 | 4/2013 | Peng et al. |
| 2013/0090171 A1 | 4/2013 | Holton et al. |
| 2013/0095857 A1 | 4/2013 | Garcia et al. |
| 2013/0104053 A1 | 4/2013 | Thornton et al. |

(56) References Cited

U.S. PATENT DOCUMENTS

| | | |
|---|---|---|
| 2013/0110885 A1 | 5/2013 | Brundrett, III |
| 2013/0111514 A1 | 5/2013 | Slavin et al. |
| 2013/0121571 A1 | 5/2013 | Gokturk et al. |
| 2013/0128059 A1 | 5/2013 | Kristensson |
| 2013/0129252 A1 | 5/2013 | Lauper |
| 2013/0132477 A1 | 5/2013 | Bosworth et al. |
| 2013/0145286 A1 | 6/2013 | Feng et al. |
| 2013/0159110 A1 | 6/2013 | Rajaram et al. |
| 2013/0159919 A1 | 6/2013 | Leydon |
| 2013/0169822 A1 | 7/2013 | Zhu et al. |
| 2013/0173729 A1 | 7/2013 | Starenky et al. |
| 2013/0177296 A1 | 7/2013 | Geisner et al. |
| 2013/0182133 A1 | 7/2013 | Tanabe |
| 2013/0185131 A1 | 7/2013 | Sinha et al. |
| 2013/0185288 A1 | 7/2013 | Nishiyama et al. |
| 2013/0191198 A1 | 7/2013 | Carlson et al. |
| 2013/0194301 A1 | 8/2013 | Robbins et al. |
| 2013/0198176 A1 | 8/2013 | Kim |
| 2013/0201527 A1 | 8/2013 | King et al. |
| 2013/0218965 A1 | 8/2013 | Abrol et al. |
| 2013/0218968 A1 | 8/2013 | Mcevilly et al. |
| 2013/0222323 A1 | 8/2013 | Mckenzie |
| 2013/0226850 A1 | 8/2013 | Hannuksela et al. |
| 2013/0227476 A1 | 8/2013 | Frey |
| 2013/0232194 A1 | 9/2013 | Knapp et al. |
| 2013/0262935 A1 | 10/2013 | Kutchuk et al. |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0275505 A1 | 10/2013 | Gauglitz et al. |
| 2013/0279757 A1 | 10/2013 | Kephart |
| 2013/0279810 A1 | 10/2013 | Li et al. |
| 2013/0288702 A1 | 10/2013 | Abu-Alqumsan et al. |
| 2013/0290443 A1 | 10/2013 | Collins et al. |
| 2013/0304646 A1 | 11/2013 | De Geer |
| 2013/0311255 A1 | 11/2013 | Cummins et al. |
| 2013/0325605 A1 | 12/2013 | Callaghan et al. |
| 2013/0325964 A1 | 12/2013 | Berberat |
| 2013/0332068 A1 | 12/2013 | Kesar et al. |
| 2013/0344896 A1 | 12/2013 | Kirmse et al. |
| 2013/0346869 A1 | 12/2013 | Asver et al. |
| 2013/0346877 A1 | 12/2013 | Borovoy et al. |
| 2014/0006020 A1 | 1/2014 | Ko et al. |
| 2014/0006129 A1 | 1/2014 | Heath |
| 2014/0011538 A1 | 1/2014 | Mulcahy et al. |
| 2014/0019264 A1 | 1/2014 | Wachman et al. |
| 2014/0032682 A1 | 1/2014 | Prado et al. |
| 2014/0043204 A1 | 2/2014 | Basnayake et al. |
| 2014/0045530 A1 | 2/2014 | Gordon et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0067945 A1 | 3/2014 | Archibong et al. |
| 2014/0075004 A1 | 3/2014 | Van Dusen et al. |
| 2014/0082651 A1 | 3/2014 | Sharifi |
| 2014/0089815 A1 | 3/2014 | Gildfind et al. |
| 2014/0092130 A1 | 4/2014 | Anderson et al. |
| 2014/0096029 A1 | 4/2014 | Schultz |
| 2014/0114565 A1 | 4/2014 | Aziz et al. |
| 2014/0122658 A1 | 5/2014 | Haeger et al. |
| 2014/0122787 A1 | 5/2014 | Shalvi et al. |
| 2014/0129953 A1 | 5/2014 | Spiegel |
| 2014/0143143 A1 | 5/2014 | Fasoli et al. |
| 2014/0149519 A1 | 5/2014 | Redfern et al. |
| 2014/0155102 A1 | 6/2014 | Cooper et al. |
| 2014/0173424 A1 | 6/2014 | Hogeg et al. |
| 2014/0173457 A1 | 6/2014 | Wang et al. |
| 2014/0188894 A1 | 7/2014 | Chechik et al. |
| 2014/0189592 A1 | 7/2014 | Benchenaa et al. |
| 2014/0201126 A1 | 7/2014 | Zadeh et al. |
| 2014/0201527 A1 | 7/2014 | Krivorot |
| 2014/0207679 A1 | 7/2014 | Cho |
| 2014/0214471 A1 | 7/2014 | Schreiner, III |
| 2014/0222564 A1 | 8/2014 | Kranendonk et al. |
| 2014/0258405 A1 | 9/2014 | Perkin |
| 2014/0265359 A1 | 9/2014 | Cheng et al. |
| 2014/0266703 A1 | 9/2014 | Dalley, Jr. et al. |
| 2014/0279061 A1 | 9/2014 | Elimeliah et al. |
| 2014/0279436 A1 | 9/2014 | Dorsey et al. |
| 2014/0279540 A1 | 9/2014 | Jackson |
| 2014/0280537 A1 | 9/2014 | Pridmore et al. |
| 2014/0282096 A1 | 9/2014 | Rubinstein et al. |
| 2014/0287779 A1 | 9/2014 | O'keefe et al. |
| 2014/0289833 A1 | 9/2014 | Briceno |
| 2014/0306986 A1 | 10/2014 | Gottesman et al. |
| 2014/0317302 A1 | 10/2014 | Naik |
| 2014/0323156 A1 | 10/2014 | Gilberton et al. |
| 2014/0324627 A1 | 10/2014 | Haver et al. |
| 2014/0324629 A1 | 10/2014 | Jacobs |
| 2014/0325383 A1 | 10/2014 | Brown et al. |
| 2014/0337346 A1 | 11/2014 | Barthel et al. |
| 2014/0359024 A1 | 12/2014 | Spiegel |
| 2014/0359032 A1 | 12/2014 | Spiegel et al. |
| 2015/0010289 A1 | 1/2015 | Lindblom |
| 2015/0012525 A1 | 1/2015 | Lindsay |
| 2015/0020086 A1 | 1/2015 | Chen et al. |
| 2015/0033366 A1 | 1/2015 | Guffrey et al. |
| 2015/0046278 A1 | 2/2015 | Pei et al. |
| 2015/0049091 A1 | 2/2015 | Nachman |
| 2015/0052431 A1 | 2/2015 | Zhu et al. |
| 2015/0071619 A1 | 3/2015 | Brough |
| 2015/0087263 A1 | 3/2015 | Branscomb et al. |
| 2015/0088622 A1 | 3/2015 | Ganschow et al. |
| 2015/0095020 A1 | 4/2015 | Leydon |
| 2015/0096042 A1 | 4/2015 | Mizrachi |
| 2015/0116529 A1 | 4/2015 | Wu et al. |
| 2015/0127710 A1 | 5/2015 | Ady et al. |
| 2015/0169827 A1 | 6/2015 | Laborde |
| 2015/0172534 A1 | 6/2015 | Miyakawa et al. |
| 2015/0178260 A1 | 6/2015 | Brunson |
| 2015/0199082 A1 | 7/2015 | Scholler et al. |
| 2015/0222814 A1 | 8/2015 | Li et al. |
| 2015/0227557 A1 | 8/2015 | Holzschneider et al. |
| 2015/0227602 A1 | 8/2015 | Ramu et al. |
| 2015/0254356 A1 | 9/2015 | Skrenta et al. |
| 2015/0261917 A1 | 9/2015 | Smith |
| 2015/0286481 A1 | 10/2015 | Walker |
| 2015/0312184 A1 | 10/2015 | Langholz et al. |
| 2015/0324395 A1 | 11/2015 | Arnold et al. |
| 2015/0350136 A1 | 12/2015 | Flynn, III et al. |
| 2015/0365795 A1 | 12/2015 | Allen et al. |
| 2015/0378502 A1 | 12/2015 | Hu et al. |
| 2016/0006927 A1 | 1/2016 | Sehn |
| 2016/0014063 A1 | 1/2016 | Hogeg et al. |
| 2016/0026912 A1 | 1/2016 | Falcon et al. |
| 2016/0085773 A1 | 3/2016 | Chang et al. |
| 2016/0085863 A1 | 3/2016 | Allen et al. |
| 2016/0086670 A1 | 3/2016 | Gross et al. |
| 2016/0099901 A1 | 4/2016 | Allen et al. |
| 2016/0147803 A1 | 5/2016 | Noll et al. |
| 2016/0147823 A1 | 5/2016 | Noll et al. |
| 2016/0150333 A1 | 5/2016 | Goldstein et al. |
| 2016/0180887 A1 | 6/2016 | Sehn |
| 2016/0182417 A1 | 6/2016 | Cordes et al. |
| 2016/0182422 A1 | 6/2016 | Sehn et al. |
| 2016/0182875 A1 | 6/2016 | Sehn |
| 2016/0196350 A1 | 7/2016 | Mau |
| 2016/0239248 A1 | 8/2016 | Sehn |
| 2016/0275414 A1 | 9/2016 | Towal |
| 2016/0277419 A1 | 9/2016 | Allen et al. |
| 2016/0321708 A1 | 11/2016 | Sehn |
| 2016/0359778 A1 | 12/2016 | Shi |
| 2016/0359957 A1 | 12/2016 | Laliberte |
| 2016/0359987 A1 | 12/2016 | Laliberte |
| 2016/0365117 A1 | 12/2016 | Boliek et al. |
| 2016/0365122 A1 | 12/2016 | Steinberg et al. |
| 2017/0004383 A1 | 1/2017 | Lin et al. |
| 2017/0006094 A1 | 1/2017 | Abou Mahmoud et al. |
| 2017/0061308 A1 | 3/2017 | Chen et al. |
| 2017/0118306 A1 | 4/2017 | Madhvanath et al. |

(56) References Cited

U.S. PATENT DOCUMENTS

| | | |
|---|---|---|
| 2017/0161382 A1 | 6/2017 | Ouimet et al. |
| 2017/0206450 A1 | 7/2017 | Umeda |
| 2017/0263029 A1 | 9/2017 | Yan et al. |
| 2017/0287006 A1 | 10/2017 | Azmoodeh et al. |
| 2017/0295250 A1 | 10/2017 | Samaranayake et al. |
| 2017/0364660 A1 | 12/2017 | Vigersky et al. |
| 2017/0374003 A1 | 12/2017 | Allen et al. |
| 2017/0374508 A1 | 12/2017 | Davis et al. |
| 2018/0341833 A1 | 11/2018 | Bernard et al. |
| 2019/0146636 A1 | 5/2019 | Kremer-Davidson et al. |
| 2020/0314586 A1 | 10/2020 | Bouba et al. |
| 2020/0382912 A1 | 12/2020 | Dancie et al. |
| 2020/0401225 A1 | 12/2020 | Jaureguiberry et al. |
| 2021/0011612 A1 | 1/2021 | Dancie et al. |
| 2021/0019575 A1 | 1/2021 | Ouimet et al. |
| 2021/0152979 A1 | 5/2021 | Berardino et al. |
| 2021/0216830 A1 | 7/2021 | Wang et al. |
| 2021/0266704 A1 | 8/2021 | Dancie et al. |
| 2021/0377693 A1 | 12/2021 | Bouba et al. |
| 2021/0409904 A1 | 12/2021 | Baylin et al. |
| 2022/0174455 A1 | 6/2022 | Guillaume |
| 2022/0269345 A1 | 8/2022 | Jaureguiberry et al. |
| 2023/0222155 A1 | 7/2023 | Ouimet et al. |
| 2024/0037141 A1 | 2/2024 | Wang et al. |

FOREIGN PATENT DOCUMENTS

| | | |
|---|---|---|
| EP | 2151797 A1 | 2/2010 |
| GB | 2399928 A | 9/2004 |
| KR | 19990073076 A | 10/1999 |
| KR | 20010078417 A | 8/2001 |
| WO | WO-1996024213 A1 | 8/1996 |
| WO | WO-1999063453 A1 | 12/1999 |
| WO | WO-2000058882 A1 | 10/2000 |
| WO | WO-2001029642 A1 | 4/2001 |
| WO | WO-2001050703 A3 | 7/2001 |
| WO | WO-2006118755 A2 | 11/2006 |
| WO | WO-2007092668 A2 | 8/2007 |
| WO | WO-2009043020 A2 | 4/2009 |
| WO | WO-2011040821 A1 | 4/2011 |
| WO | WO-2011119407 A1 | 9/2011 |
| WO | WO-2012000107 A1 | 1/2012 |
| WO | WO-2013008238 A1 | 1/2013 |
| WO | WO-2013008251 A2 | 1/2013 |
| WO | WO-2013045753 A1 | 4/2013 |
| WO | WO-2014006129 A1 | 1/2014 |
| WO | WO-2014068573 A1 | 5/2014 |
| WO | WO-2014115136 A1 | 7/2014 |
| WO | WO-2014194262 A2 | 12/2014 |
| WO | WO-2015192026 A1 | 12/2015 |
| WO | WO-2016044424 A1 | 3/2016 |
| WO | WO-2016054562 A1 | 4/2016 |
| WO | WO-2016065131 A1 | 4/2016 |
| WO | WO-2016100318 A2 | 6/2016 |
| WO | WO-2016100318 A3 | 6/2016 |
| WO | WO-2016100342 A1 | 6/2016 |
| WO | WO-2016/112299 A1 | 7/2016 |
| WO | WO-2016149594 A1 | 9/2016 |
| WO | WO-2016179166 A1 | 11/2016 |
| WO | WO-2016179235 A1 | 11/2016 |
| WO | WO-2017100476 A1 | 6/2017 |
| WO | WO-2017176739 A1 | 10/2017 |
| WO | WO-2017176992 A1 | 10/2017 |
| WO | WO-2018005644 A1 | 1/2018 |

OTHER PUBLICATIONS

"Adding photos to your listing", eBay, [Online] Retrieved from the Internet: <URL: http://pages.ebay.com/help/sell/pictures.html>, (accessed May 24, 2017), 4 pgs.

"U.S. Appl. No. 15/008,885, Advisory Action mailed Jan. 18, 2024", 3 pgs.

"U.S. Appl. No. 15/008,885, Advisory Action mailed Apr. 21, 2023", 4 pgs.

"U.S. Appl. No. 15/008,885, Final Office Action mailed Feb. 3, 2023", 54 pgs.

"U.S. Appl. No. 15/008,885, Final Office Action mailed Feb. 10, 2021", 47 pgs.

"U.S. Appl. No. 15/008,885, Final Office Action mailed Mar. 6, 2019", 32 pgs.

"U.S. Appl. No. 15/008,885, Final Office Action mailed Mar. 21, 2022", 49 pgs.

"U.S. Appl. No. 15/008,885, Final Office Action mailed Apr. 24, 2020", 38 pgs.

"U.S. Appl. No. 15/008,885, Final Office Action mailed Oct. 16, 2023", 59 pgs.

"U.S. Appl. No. 15/008,885, Non Final Office Action mailed Apr. 25, 2024", 58 pgs.

"U.S. Appl. No. 15/008,885, Non Final Office Action mailed May 19, 2023", 56 pgs.

"U.S. Appl. No. 15/008,885, Non Final Office Action mailed Jul. 29, 2021", 49 pgs.

"U.S. Appl. No. 15/008,885, Non Final Office Action mailed Aug. 6, 2018", 35 pgs.

"U.S. Appl. No. 15/008,885, Non Final Office Action mailed Aug. 6, 2020", 40 pgs.

"U.S. Appl. No. 15/008,885, Non Final Office Action mailed Sep. 8, 2022", 52 pgs.

"U.S. Appl. No. 15/008,885, Non Final Office Action mailed Oct. 2, 2019", 38 pgs.

"U.S. Appl. No. 15/008,885, Response filed Jan. 6, 2021 to Non Final Office Action mailed Aug. 6, 2020", 12 pgs.

"U.S. Appl. No. 15/008,885, Response filed Feb. 3, 2020 to Non Final Office Action mailed Oct. 2, 2019", 12 pgs.

"U.S. Appl. No. 15/008,885, Response filed Apr. 3, 2023 to Final Office Action mailed Feb. 3, 2023", 13 pgs.

"U.S. Appl. No. 15/008,885, Response filed Apr. 16, 2024 to Advisory Action mailed Jan. 18, 2024", 14 pgs.

"U.S. Appl. No. 15/008,885, Response filed May 2, 2023 to Advisory Action mailed Apr. 21, 2023", 13 pgs.

"U.S. Appl. No. 15/008,885, Response filed Jul. 12, 2021 to Final Office Action mailed Feb. 10, 2021", 14 pgs.

"U.S. Appl. No. 15/008,885, Response filed Jul. 24, 2020 to Final Office Action mailed Apr. 24, 2020", 12 pgs.

"U.S. Appl. No. 15/008,885, Response filed Aug. 22, 2022 to Final Office Action mailed Mar. 21, 2022", 11 pgs.

"U.S. Appl. No. 15/008,885, Response filed Sep. 19, 2023 to Non Final Office Action mailed May 19, 2023", 12 pgs.

"U.S. Appl. No. 15/008,885, Response filed Jan. 7, 2019 to Non Final Office Action mailed Aug. 6, 2018", 10 pgs.

"U.S. Appl. No. 15/008,885, Response filed Nov. 29, 2021 to Non Final Office Action mailed Jul. 29, 2021", 14 pgs.

"U.S. Appl. No. 15/008,885, Response filed Dec. 8, 2022 to Non Final Office Action mailed Sep. 8, 2022", 12 pgs.

"U.S. Appl. No. 15/008,885, Response filed Dec. 18, 2023 to Final Office Action mailed Oct. 16, 2023", 14 pgs.

"U.S. Appl. No. 15/008,885, Response filed Sep. 6, 2019 to Final Office Action mailed Mar. 6, 2019", 12 pgs.

"U.S. Appl. No. 15/008,956, 312 Amendment filed Dec. 17, 2024", 8 pgs.

"U.S. Appl. No. 15/008,956, Examiner Interview Summary mailed Apr. 10, 2023", 2 pgs.

"U.S. Appl. No. 15/008,956, Final Office Action mailed Mar. 5, 2019", 21 pgs.

"U.S. Appl. No. 15/008,956, Final Office Action mailed Apr. 16, 2021", 36 pgs.

"U.S. Appl. No. 15/008,956, Final Office Action mailed May 1, 2020", 27 pgs.

"U.S. Appl. No. 15/008,956, Final Office Action mailed Jul. 29, 2022", 51 pgs.

"U.S. Appl. No. 15/008,956, Final Office Action mailed Aug. 21, 2023", 19 pgs.

"U.S. Appl. No. 15/008,956, Non Final Office Action mailed Feb. 28, 2024", 26 pgs.

(56)                    References Cited

OTHER PUBLICATIONS

"U.S. Appl. No. 15/008,956, Non Final Office Action mailed Aug. 6, 2018", 22 pgs.
"U.S. Appl. No. 15/008,956, Non Final Office Action mailed Aug. 21, 2020", 30 pgs.
"U.S. Appl. No. 15/008,956, Non Final Office Action mailed Oct. 4, 2019", 21 pgs.
"U.S. Appl. No. 15/008,956, Non Final Office Action mailed Oct. 4, 2021", 45 pgs.
"U.S. Appl. No. 15/008,956, Non Final Office Action mailed Dec. 8, 2022", 22 pgs.
"U.S. Appl. No. 15/008,956, Notice of Allowance mailed Sep. 18, 2024", 16 pgs.
"U.S. Appl. No. 15/008,956, Response filed Jan. 8, 2019 to Non Final Office Action mailed Aug. 6, 2018", 11 pgs.
"U.S. Appl. No. 15/008,956, Response filed Feb. 4, 2020 to Non Final Office Action mailed Oct. 4, 2019", 11 pgs.
"U.S. Appl. No. 15/008,956, Response filed Feb. 22, 2021 to Non Final Office Action mailed Aug. 21, 2020", 10 pgs.
"U.S. Appl. No. 15/008,956, Response filed Apr. 4, 2022 to Non Final Office Action mailed Oct. 4, 2021", 13 pgs.
"U.S. Appl. No. 15/008,956, Response filed May 8, 2023 to Non Final Office Action mailed Dec. 8, 2022", 12 pgs.
"U.S. Appl. No. 15/008,956, Response filed Jul. 29, 2024 to Non Final Office Action mailed Feb. 28, 2024", 13 pgs.
"U.S. Appl. No. 15/008,956, Response filed Aug. 3, 2020 to Final Office Action mailed May 1, 2020", 10 pgs.
"U.S. Appl. No. 15/008,956, Response filed Sep. 16, 2021 to Final Office Action mailed Apr. 16, 2021", 11 pgs.
"U.S. Appl. No. 15/008,956, Response filed Nov. 18, 2022 to Final Office Action mailed Jul. 29, 2022", 14 pgs.
"U.S. Appl. No. 15/008,956, Response filed Dec. 12, 2023 to Final Office Action mailed Aug. 21, 2023", 14 pgs.
"U.S. Appl. No. 15/008,956, Response filed Sep. 5, 2019 to Final Office Action mailed Mar. 5, 2019", 9 pgs.
"BlogStomp", StompSoftware, [Online] Retrieved from the Internet: <URL: http://stompsoftware.com/blogstomp>, (accessed May 24, 2017), 12 pgs.
"Cup Magic Starbucks Holiday Red Cups come to life with AR app", Blast Radius, [Online] Retrieved from the Internet: <URL: https://web.archive.org/web/20160711202454/http://www.blastradius.com/work/cup-magic>, (2016), 7 pgs.
"Daily App: InstaPlace (iOS/Android): Give Pictures a Sense of Place", TechPP, [Online] Retrieved from the Internet: <URL: http://techpp.com/2013/02/15/instaplace-app-review>, (2013), 13 pgs.
"How to Search by Image on Google", Google, [Online]. Retrieved from the Internet: <URL: http://www.wikihow.com/Search-by-Image-on-Google, (Accessed Nov. 17, 2015), 3 pgs.
"InstaPlace Photo App Tell The Whole Story", [Online] Retrieved from the Internet: <URL: youtu.be/uF_gFkg1hBM>, (Nov. 8, 2013), 113 pgs., 1:02 min.
"International Application Serial No. PCT/US2015/037251, International Search Report mailed Sep. 29, 2015", 2 pgs.
"International Application Serial No. PCT/US2016/065660, International Preliminary Report on Patentability mailed Jun. 21, 2018", 13 pgs.
"International Application Serial No. PCT/US2016/065660, International Search Report mailed May 2, 2017", 7 pgs.
"International Application Serial No. PCT/US2016/065660, Invitation to Pay Add'l Fees and Partial Search Rpt mailed Mar. 3, 2017", 6 pgs.
"International Application Serial No. PCT/US2016/065660, Written Opinion mailed May 2, 2017", 13 pgs.
"Introducing Snapchat Stories", [Online] Retrieved from the Internet: <URL: https://web.archive.org/web/20131026084921/https://www.youtube.com/watch?v=88Cu3yN-LIM>, (Oct. 3, 2013), 92 pgs.; 00:47 min.

"Macy's Believe-o-Magic", [Online] Retrieved from the Internet: <URL: https://web.archive.org/web/20190422101854/https://www.youtube.com/watch?v=xvzRXy3J0Z0&feature=youtu.be>, (Nov. 7, 2011), 102 pgs.; 00:51 min.
"Macy's Introduces Augmented Reality Experience in Stores across Country as Part of Its 2011 Believe Campaign", Business Wire, [Online] Retrieved from the Internet: <URL: https://www.businesswire.com/news/home/20111102006759/en/Macys-Introduces-Augmented-Reality-Experience-Stores-Country>, (Nov. 2, 2011), 6 pgs.
"Starbucks Cup Magic", [Online] Retrieved from the Internet: <URL: https://www.youtube.com/watch?v=RWwQXi9RGOw>, (Nov. 8, 2011), 87 pgs.; 00:47 min.
"Starbucks Cup Magic for Valentine's Day", [Online] Retrieved from the Internet: <URL: https://www.youtube.com/watch?v=8nvqOzjq10w>, (Feb. 6, 2012), 88 pgs.; 00:45 min.
"Starbucks Holiday Red Cups Come to Life, Signaling the Return of the Merriest Season", Business Wire, [Online] Retrieved from the Internet: <URL: http://www.businesswire.com/news/home/20111115005744/en/2479513/Starbucks-Holiday-Red-Cups-Life-Signaling-Return>, (Nov. 15, 2011), 5 pgs.
Carthy, Roi, "Dear All Photo Apps: Mobli Just Won Filters", TechCrunch, [Online] Retrieved from the Internet: <URL: https://techcrunch.com/2011/09/08/mobli-filters>, (Sep. 8, 2011), 10 pgs.
Janthong, Isaranu, "Instaplace ready on Android Google Play store", Android App Review Thailand, [Online] Retrieved from the Internet: <URL: http://www.android-free-app-review.com/2013/01/instaplace-android-google-play-store.html>, (Jan. 23, 2013), 9 pgs.
Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.
MacLeod, Duncan, "Macys Believe-o-Magic App", [Online] Retrieved from the Internet: <URL: http://theinspirationroom.com/daily/2011/macys-believe-o-magic-app>, (Nov. 14, 2011), 10 pgs.
MacLeod, Duncan, "Starbucks Cup Magic Lets Merry", [Online] Retrieved from the Internet: <URL: http://theinspirationroom.com/daily/2011/starbucks-cup-magic>, (Nov. 12, 2011), 8 pgs.
Notopoulos, Katie, "A Guide to The New Snapchat Filters and Big Fonts", [Online] Retrieved from the Internet: <URL: https://www.buzzfeed.com/katienotopoulos/a-guide-to-the-new-snapchat-filters-and-big-fonts?utm_term=.bkQ9qVZWe#.nv58YXpkV>, (Dec. 22, 2013), 13 pgs.
Panzarino, Matthew, "Snapchat Adds Filters, A Replay Function and for Whatever Reason, Time, Temperature And Speed Overlays", TechCrunch, [Online] Retrieved form the Internet: <URL: https://techcrunch.com/2013/12/20/snapchat-adds-filters-new-font-and-for-some-reason-time-temperature-and-speed-overlays/>, (Dec. 20, 2013), 12 pgs.
Tripathi, Rohit, "Watermark Images in PHP and Save File on Server", [Online] Retrieved from the Internet: <URL: http://code.rohitink.com/2012/12/28/watermark-images-in-php-and-save-file-on-server>, (Dec. 28, 2012), 4 pgs.
"U.S. Appl. No. 15/008,885, Final Office Action mailed Oct. 15, 2024", 58 pgs.
"U.S. Appl. No. 15/008,885, Response filed Sep. 25, 2024 to Non Final Office Action mailed Apr. 25, 2024", 12 pgs.
"U.S. Appl. No. 15/009,402, Final Office Action mailed Jan. 27, 2022", 29 pgs.
"U.S. Appl. No. 15/009,402, Final Office Action mailed Jan. 31, 2024", 38 pgs.
"U.S. Appl. No. 15/009,402, Final Office Action mailed Feb. 28, 2020", 22 pgs.
"U.S. Appl. No. 15/009,402, Final Office Action mailed Mar. 22, 2019", 17 pgs.
"U.S. Appl. No. 15/009,402, Final Office Action mailed Dec. 22, 2022", 34 pgs.
"U.S. Appl. No. 15/009,402, Final Office Action mailed Dec. 30, 2020", 30 pgs.
"U.S. Appl. No. 15/009,402, Non Final Office Action mailed May 23, 2023", 36 pgs.
"U.S. Appl. No. 15/009,402, Non Final Office Action mailed Jul. 9, 2021", 25 pgs.
"U.S. Appl. No. 15/009,402, Non Final Office Action mailed Jul. 21, 2022", 33 pgs.

(56) References Cited

OTHER PUBLICATIONS

"U.S. Appl. No. 15/009,402, Non Final Office Action mailed Aug. 5, 2020", 23 pgs.

"U.S. Appl. No. 15/009,402, Non Final Office Action mailed Aug. 16, 2018", 18 pgs.

"U.S. Appl. No. 15/009,402, Non Final Office Action mailed Oct. 3, 2019", 19 pgs.

"U.S. Appl. No. 15/009,402, Response filed Jan. 16, 2019 to Non Final Office Action mailed Aug. 16, 2018", 7 pgs.

"U.S. Appl. No. 15/009,402, Response filed Feb. 3, 2020 to Non Final Office Action mailed Oct. 3, 2019", 11 pgs.

"U.S. Appl. No. 15/009,402, Response filed Apr. 24, 2023 to Final Office Action mailed Dec. 22, 2022", 15 pgs.

"U.S. Appl. No. 15/009,402, Response filed Apr. 30, 2021 to Final Office Action mailed Dec. 30, 2020", 11 pgs.

"U.S. Appl. No. 15/009,402, Response filed Jun. 22, 2020 to Final Office Action mailed Feb. 28, 2020", 10 pgs.

"U.S. Appl. No. 15/009,402, Response filed Jun. 27, 2022 to Final Office Action mailed Jan. 27, 2022", 11 pgs.

"U.S. Appl. No. 15/009,402, Response filed Sep. 21, 2019 to Final Office Action mailed Mar. 22, 2019", 11 pgs.

"U.S. Appl. No. 15/009,402, Response filed Oct. 23, 2023 to Non Final Office Action mailed May 23, 2023", 12 pgs.

"U.S. Appl. No. 15/009,402, Response filed Nov. 5, 2020 to Non Final Office Action mailed Aug. 5, 2020", 11 pgs.

"U.S. Appl. No. 15/009,402, Response filed Nov. 21, 2022 to Non Final Office Action mailed Jul. 21, 2022", 12 pgs.

"U.S. Appl. No. 15/009,402, Response filed Dec. 9, 2021 to Non Final Office Action mailed Jul. 9, 2021", 11 pgs.

"U.S. Appl. No. 15/247,697, Corrected Notice of Allowability mailed Sep. 21, 2018", 13 pgs.

"U.S. Appl. No. 15/247,697, Examiner Interview Summary mailed Aug. 8, 2018", 1 pg.

"U.S. Appl. No. 15/247,697, Notice of Allowance mailed Aug. 8, 2018", 25 pgs.

"U.S. Appl. No. 15/265,672, Non Final Office Action mailed Jan. 14, 2019", 10 pgs.

"U.S. Appl. No. 15/265,672, Non Final Office Action mailed Jul. 15, 2019", 9 pgs.

"U.S. Appl. No. 15/265,672, Notice of Allowance mailed Jan. 28, 2020", 10 pgs.

"U.S. Appl. No. 15/265,672, Response filed Apr. 15, 2019 to Non Final Office Action mailed Jan. 14, 2019", 12 pgs.

"U.S. Appl. No. 15/265,672, Response filed Oct. 14, 2019 to Non-Final Office Action mailed Jul. 15, 2019", 11 pgs.

"U.S. Appl. No. 15/929,483, Examiner Interview Summary mailed Jun. 6, 2022", 3 pgs.

"U.S. Appl. No. 15/929,483, Final Office Action mailed Sep. 9, 2022", 14 pgs.

"U.S. Appl. No. 15/929,483, Non Final Office Action mailed Jan. 21, 2022", 18 pgs.

"U.S. Appl. No. 15/929,483, Notice of Allowance mailed Dec. 7, 2022", 10 pgs.

"U.S. Appl. No. 15/929,483, Preliminary Amendment filed Oct. 13, 2020", 7 pgs.

"U.S. Appl. No. 15/929,483, Response filed Jun. 21, 2022 to Non Final Office Action mailed Jan. 21, 2022", 12 pgs.

"U.S. Appl. No. 15/929,483, Response filed Nov. 4, 2022 to Final Office Action mailed Sep. 9, 2022", 8 pgs.

"U.S. Appl. No. 16/192,419, Advisory Action mailed Feb. 27, 2020", 3 pgs.

"U.S. Appl. No. 16/192,419, Corrected Notice of Allowability mailed Feb. 10, 2021", 1 pg.

"U.S. Appl. No. 16/192,419, Examiner Interview Summary mailed Feb. 13, 2020", 4 pgs.

"U.S. Appl. No. 16/192,419, Final Office Action mailed Dec. 2, 2019", 29 pgs.

"U.S. Appl. No. 16/192,419, Non Final Office Action mailed Apr. 9, 2019", 26 pgs.

"U.S. Appl. No. 16/192,419, Non Final Office Action mailed Apr. 23, 2020", 27 pgs.

"U.S. Appl. No. 16/192,419, Notice of Allowance mailed Oct. 21, 2020", 10 pgs.

"U.S. Appl. No. 16/192,419, Response filed Feb. 3, 2020 to Final Office Action mailed Dec. 2, 2019", 13 pgs.

"U.S. Appl. No. 16/192,419, Response filed Sep. 23, 2020 to Non Final Office Action mailed Apr. 23, 2020", 11 pgs.

"U.S. Appl. No. 16/192,419, Response filed Aug. 8, 2019 to Non-Final Office Action mailed Apr. 9, 2019", 12 pgs.

"U.S. Appl. No. 16/192,419, Supplemental Notice of Allowability mailed Feb. 24, 2021", 2 pgs.

"U.S. Appl. No. 17/248,386, Amendment under 37 C.F.R. 1.312 filed Oct. 6, 2023", 6 pgs.

"U.S. Appl. No. 17/248,386, Notice of Allowability mailed Sep. 7, 2023", 7 pgs.

"U.S. Appl. No. 17/248,386, Notice of Allowance mailed Jul. 7, 2023", 10 pgs.

"U.S. Appl. No. 17/248,386, Preliminary Amendment filed Apr. 5, 2021", 7 pgs.

"U.S. Appl. No. 17/248,386, PTO Response to Rule 312 Communication mailed Oct. 20, 2023", 2 pgs.

"U.S. Appl. No. 18/122,328, Final Office Action mailed Apr. 16, 2024", 31 pgs.

"U.S. Appl. No. 18/122,328, Non Final Office Action mailed Aug. 1, 2024", 31 pgs.

"U.S. Appl. No. 18/122,328, Non Final Office Action mailed Sep. 28, 2023", 28 pgs.

"U.S. Appl. No. 18/122,328, Response filed Jan. 25, 2024 to Non Final Office Action mailed Sep. 28, 2023", 10 pgs.

"U.S. Appl. No. 18/122,328, Response filed Jul. 16, 2024 to Final Office Action mailed Apr. 16, 2024", 12 pgs.

Castelluccia, Claude, et al., "EphPub: Toward robust Ephemeral Publishing", 19th IEEE International Conference on Network Protocols (ICNP), (Oct. 17, 2011), 18 pgs.

Chetlur, Sharan, et al., "cuDNN: Efficient Primitives for Deep Learning", arXiv:1410.0759v3, (Dec. 18, 2014), 9 pgs.

Fajman, "An Extensible Message Format for Message Disposition Notifications", Request for Comments: 2298, National Institutes of Health, (Mar. 1998), 28 pgs.

Huynh, Loc N, et al., "DeepSense: A GPU-based Deep Convolutional Neural Network Framework on Commodity Mobile Devices", Proc. of the ACM Workshop on Wearable Systems and Applications, (2016), 6 pgs.

Li, H., et al., "Interactive Multimodal Visual Search on Mobile Device", IEEE Transactions on Multimedia, vol. 15, No. 3, (Apr. 2013), 594-607.

Long, Jonathan, et al., "Fully Convolutional Networks for Semantic Segmentation", IEEE Conference on Computer Vision and Pattern Recognition (CVPR), Boston, MA, [Online] Retrieved from the internet: <https://openaccess.thecvf.com/content_cvpr_2015/papers/Long_Fully_Convolutional_Networks_2015_CVPR_paper.pdf>, (Jun. 2015), 10 pgs.

Melanson, Mike, "This text message will self destruct in 60 seconds", [Online] Retrieved from the Internet: <URL: http://readwrite.com/2011/02/11/this_text_message_will_self_destruct_in_60_seconds>, (Feb. 18, 2015), 4 pgs.

Sawers, Paul, "Snapchat for iOS Lets You Send Photos to Friends and Set How long They're Visible For", [Online] Retrieved from the Internet: <URL: https://thenextweb.com/news/snapchat-for-ios-lets-you-send-photos-to-friends-and-set-how-long-theyre-visible-for>, (May 7, 2012), 5 pgs.

Shein, Esther, "Ephemeral Data", Communications of the ACM, vol. 56, No. 9, (Sep. 2013), 3 pgs.

Vaas, Lisa, "StealthText, Should You Choose to Accept It", [Online] Retrieved from the Internet: <URL: https://www.eweek.com/enterprise-apps/stealthtext-should-you-choose-to-accept-it/>, (Dec. 13, 2005), 3 pgs.

Vallet, Alexis, et al., "A Multi-Label Convolutional Neural Network for Automatic Image Annotation", Journal of Information Processing, vol. 23, No. 6, (Nov. 2015), 10 pgs.

"U.S. Appl. No. 15/008,885, Corrected Notice of Allowability mailed Jun. 12, 2025", 2 pgs.

(56)                    References Cited

OTHER PUBLICATIONS

"U.S. Appl. No. 15/008,885, Examiner Interview Summary mailed Jan. 27, 2025", 2 pgs.
"U.S. Appl. No. 15/008,885, Notice of Allowance mailed Mar. 14, 2025", 17 pgs.
"U.S. Appl. No. 15/008,885, Response filed Feb. 17, 2025 to Final Office Action mailed Oct. 15, 2024", 13 pgs.
"U.S. Appl. No. 15/008,956, PTO Response to Rule 312 Communication mailed Jan. 6, 2025", 2 pgs.

* cited by examiner

CLIENT DEVICE 102

MESSAGING CLIENT APPLICATION 104

CLIENT DEVICE 102

MESSAGING CLIENT APPLICATION 104

NETWORK 106

API SERVER 110

APPLICATION SERVER 112

MESSAGING SERVER APPLICATION 114

IMAGE PROCESSING SYSTEM 116

SOCIAL NETWORK SYSTEM 122

DATABASE SERVER 118

DATABASE 120

MESSAGING SERVER SYSTEM 108

MESSAGING CLIENT APPLICATION 104

EPHEMERAL TIMER SYSTEM 202

COLLECTION MANAGEMENT SYSTEM 204

CURATION INTERFACE 208

ANNOTATION SYSTEM 206

APPLICATION SERVER 112

300

ENTITY GRAPH

DATABASE 120

400

SEARCH PROCESSOR <u>620</u>

IMAGE PROCESSORS <u>702</u>

AUDIO PROCESSOR <u>704</u>

MOTION PROCESSORS <u>706</u>

LOCATION PROCESSORS <u>708</u>

BUS <u>710</u>

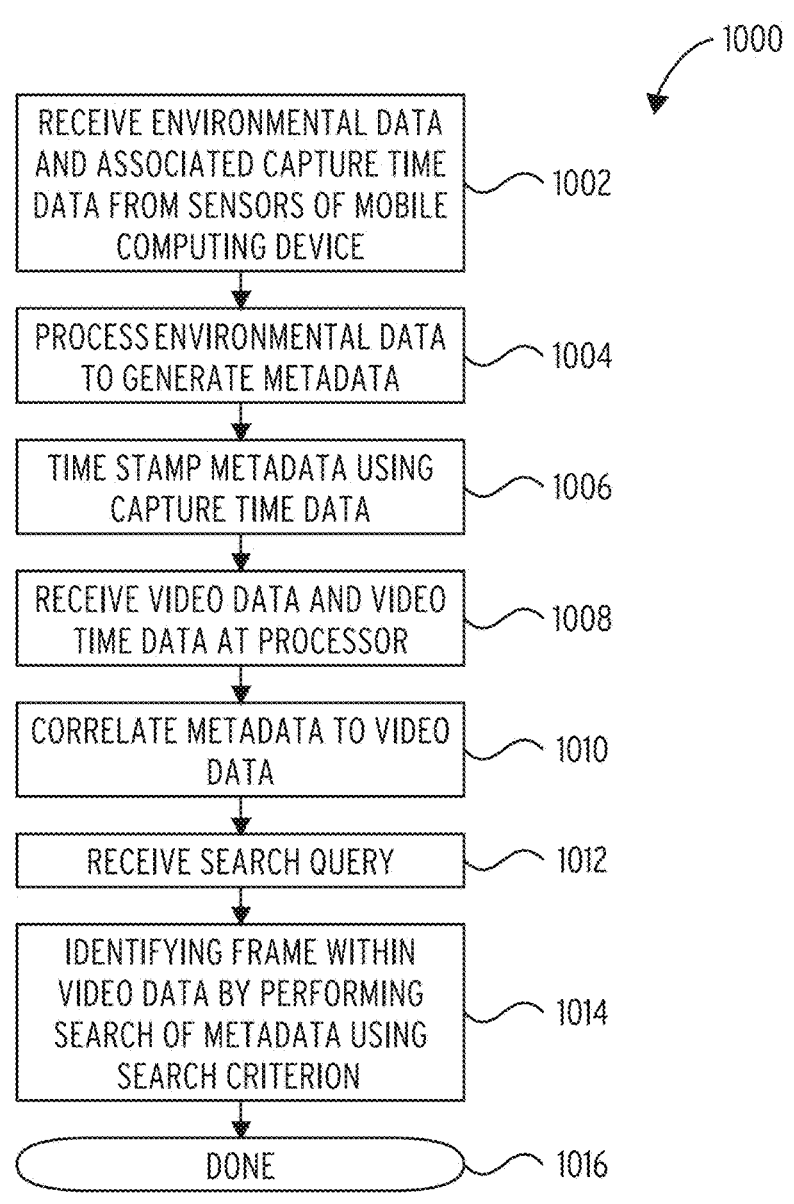

_1000_

RECEIVE ENVIRONMENTAL DATA AND ASSOCIATED CAPTURE TIME DATA FROM SENSORS OF MOBILE COMPUTING DEVICE — 1002

PROCESS ENVIRONMENTAL DATA TO GENERATE METADATA — 1004

TIME STAMP METADATA USING CAPTURE TIME DATA — 1006

RECEIVE VIDEO DATA AND VIDEO TIME DATA AT PROCESSOR — 1008

CORRELATE METADATA TO VIDEO DATA — 1010

RECEIVE SEARCH QUERY — 1012

IDENTIFYING FRAME WITHIN VIDEO DATA BY PERFORMING SEARCH OF METADATA USING SEARCH CRITERION — 1014

DONE — 1016

RECEIVE PLURALITY OF IMAGES FROM CONTENT OWNER — 1102

CREATE INDEX USING PLURALITY OF IMAGES — 1104

RECEIVE FURTHER IMAGE FROM MOBILE COMPUTING DEVICE OF USER — 1106

DETERMINE CORRELATION BETWEEN FURTHER IMAGE — 1108

DIRECT MOBILE COMPUTING DEVICE OF USER TO CONTENT OF CONTENT OWNER, RESPONSIVE TO DETERMINING OF CORRELATION — 1110

DONE — 1112

1400

IMAGE

1402

1404

1412

1406

1408

1410

1414

1416

1418

CLIENT DEVICE 102

1500

QUERY IMAGE 1502

SEARCH TERMS 1504

CAR
AUTOMOBILE
TRANSPORT

IMAGE RESULTS 1506

VIDEO RESULTS 1508

CLIENT DEVICE 102

REDIRECTION TO DIGITAL CONTENT BASED ON IMAGE-SEARCH

CROSS-REFERENCE TO RELATED APPLICATIONS

This application is a continuation of U.S. patent application Ser. No. 15/008,956, filed Jan. 28, 2016, which claims the benefit of priority of U.S. Provisional Application Ser. No. 62/264,549, filed Dec. 8, 2015, each of which is hereby incorporated by reference in its entirety.

BACKGROUND

Image-based searching has become more prevalent, and of greater interest, with the increased adoption of mobile technologies, and particularly the widespread use of mobile devices having integrated camera systems. The ubiquitous availability of mobile devices and cameras as presented the opportunity for both hardware and software companies to provide image-based searching capabilities on these mobile devices to their users.

Image-based searching typically requires the user to specify a query on the basis of an image, rather than text. This presents a number of technical challenges, particularly with respect to user interface technologies and paradigms. A number of prior art technologies to improve upon image of the messaging have been proposed.

US patent application publication number 2015/0052431 describes touch controls for image-based search. Specifically, gesture information, received via a touch-sensitive screen, is used to generate a selection area on an image. A processor circuit extracts an image portion corresponding to the selection area, and performs an image-based search using the extracted image portion.

US patent application publication number 2014/0188894 describes receiving gesture data based on a user gesture interacting with a portion of displayed content. A subset of the displayed content is identified based on the gesture data, and a set of candidate queries is identified based on the subset of content.

US patent application publication number 2012/0166472 describes a system for developing a query by manipulating tangible (physical) objects that represent the query.

U.S. Pat. No. 8,850,490 describes an Internet-based content platform that includes a search graphical user interface to present search results in response to a search query from an end user. The search can be a text-based search, an image-based search, and audio-based search, a video-based search, a biometric input-based search et cetera.

While the above described technologies have advanced image-based search technologies in general, a number of technical challenges remain.

BRIEF SUMMARY

In some embodiments, a method to perform image-based searching may include receiving a group of images from a content owner; creating an index using the group of images; receiving a further image from a mobile computing device of a user; determining a correlation between the further image and the index; and/or directing the mobile computing device of the user to content of the content owner, responsive to the determining of the correlation.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 10 is a flowchart illustrating a method, according to some examples, of processing image data.

DETAILED DESCRIPTION

Glossary

Figure 1:
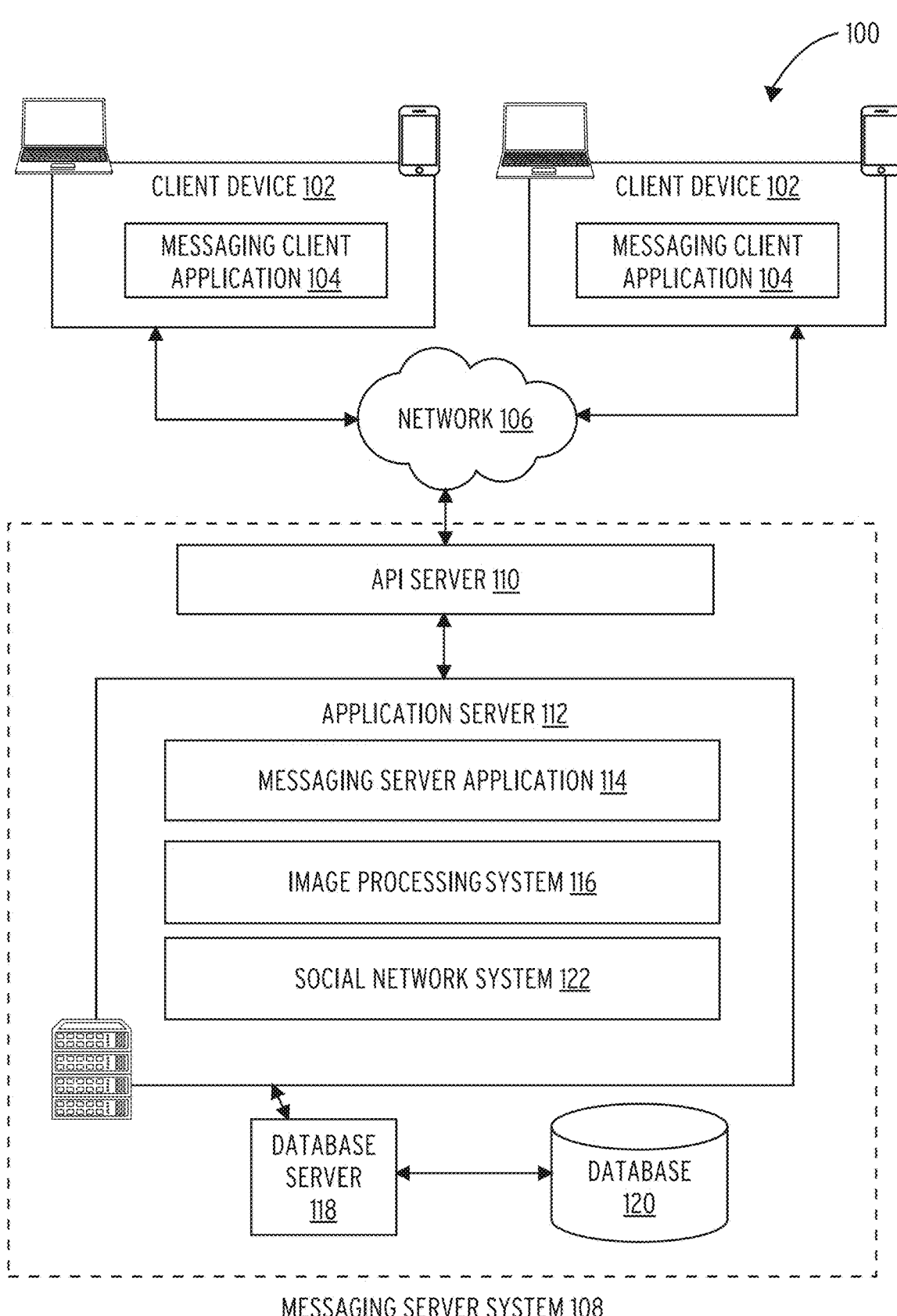
FIG. 1 is a block diagram showing an example messaging system for exchanging data (e.g., messages and associated content) over a network.

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, net-books, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"MODULE" in this context refers to logic having boundaries defined by function or subroutine calls, branch points, application program interfaces (APIs), or other technologies that provide for the partitioning or modularization of particular processing or control functions. Modules are typically combined via their interfaces with other modules to carry out a machine process. A module may be a packaged functional hardware unit designed for use with other components and a part of a program that usually performs a particular function of related functions. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein. In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations. Accordingly, the phrase "hardware module" (or "hardware-implemented module") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time. Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors. Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

DESCRIPTION

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2015, SNAPCHAT, INC., All Rights Reserved.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

DRAWINGS

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include, message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116 and a social network system 122. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services, and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following", and also the identification of other entities and interests of a particular user.

The application server 112 is communicatively coupled to a database server 118, which facilitates access to a database 120 in which is stored data associated with messages processed by the messaging server application 114.

Figure 2:
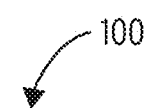
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a SNAPCHAT story), selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a SNAPCHAT filter) to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay including text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
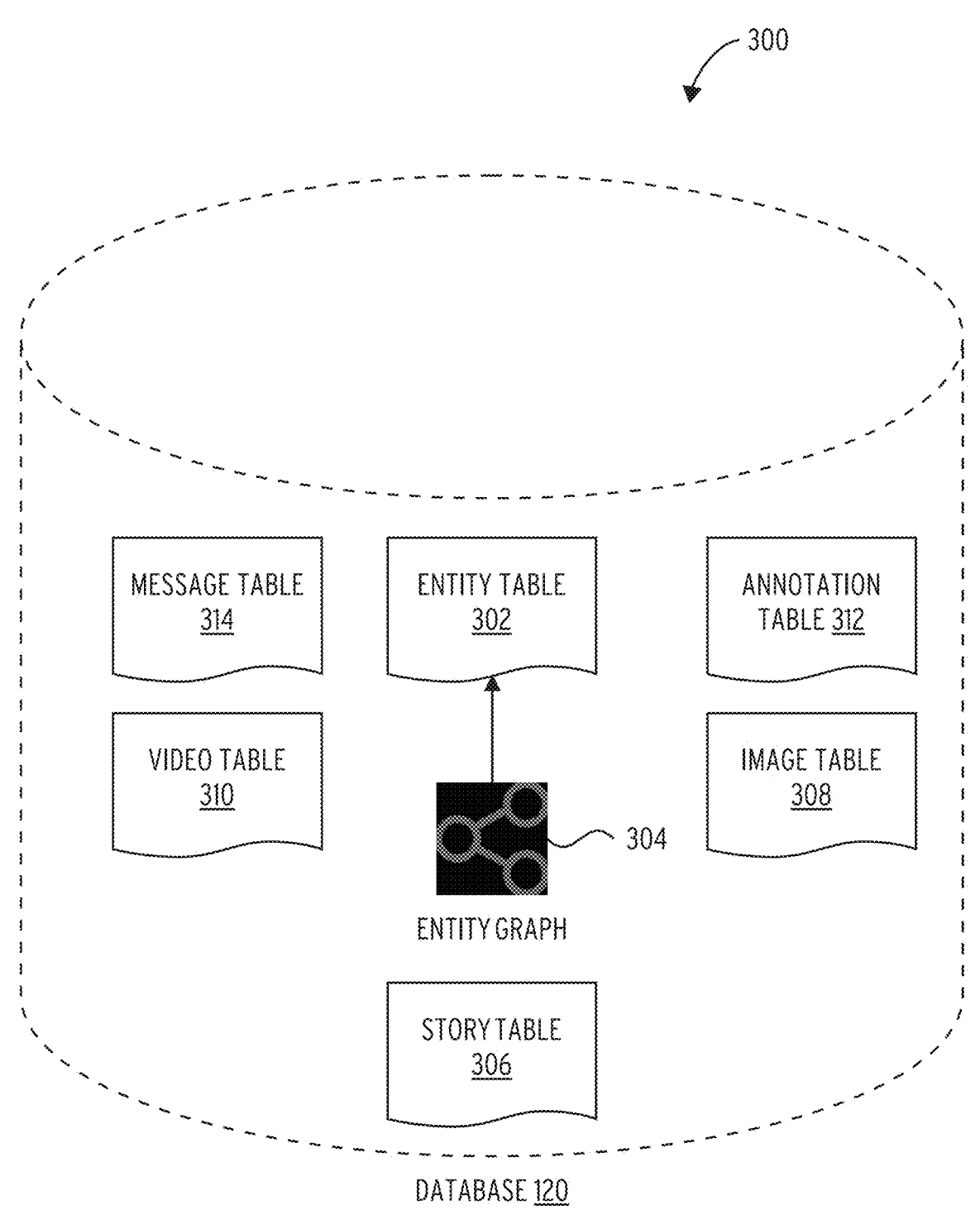
FIG. 3 is a schematic diagram illustrating data which may be stored in the database of the messaging server system, according to certain example embodiments.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time FIG. 3 is a schematic diagram illustrating data 300, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. The entity table 302 stores entity data, including an entity graph 304. Entities for which records are maintained within the entity table 302 may include individuals, corporate entities, organizations, objects, places, events etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization) interested-based or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of varies types, including a user-selected filters from a gallery of filters presented to a sending user by the messaging client application 104 when the sending user is composing a message. Other types of filers include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the client device 102. Another type of filer is a data filer, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102 or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video or audio data, which are compiled into a collection (e.g., a SNAPCHAT story or a gallery). The creation of a particular collection may be initiated by a particular user (e.g., each user for which a record is maintained in the entity table 302) A user may create a "personal story" in the form of a collection of content that has been created and sent/broadcast by that user. To this end, the user interface of the messaging client application 104 may include an icon that is user selectable to enable a sending user to add specific content to his or her personal story.

A collection may also constitute a "live story," which is a collection of content from multiple users that is created manually, automatically or using a combination of manual and automatic techniques. For example, a "live story" may constitute a curated stream of user-submitted content from varies locations and events. Users, whose client devices have location services enabled and are at a common location event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story", which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
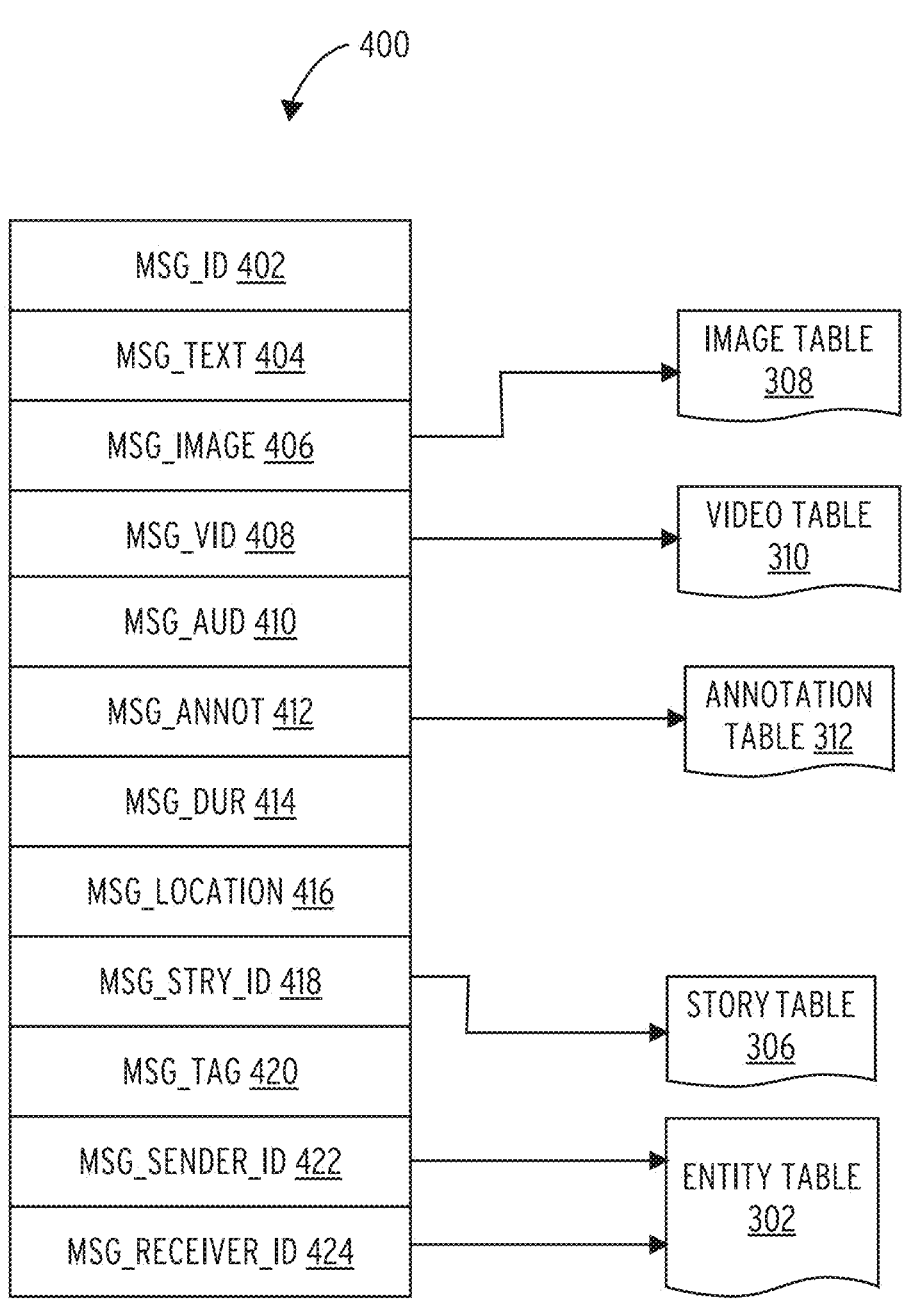
FIG. 4 is a schematic diagram illustrating a structure of a message, according to some embodiments, generated by a messaging client application for communication.

FIG. 4 is a schematic diagram illustrating a structure of a message 400, according to some in some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102 and that is included in the message 400.

A message image payload 406: image data, captured by a camera component of a client device 102 or retrieved from memory of a client device 102, and that is included in the message 400.

A message video payload 408: video data, captured by a camera component or retrieved from a memory component of the client device 102 and that is included in the message 400.

A message audio payload 410: audio data, captured by a microphone or retrieved from the memory component of the client device 102, and that is included in the message 400.

A message annotations 412: annotation data (e.g., filters, stickers or other enhancements) that represents annotations to be applied to message image payload 406, message video payload 408, or message audio payload 410 of the message 400.

A message duration parameter 414: parameter value indicating, in seconds, the amount of time for which content of the message (e.g., the message image payload 406, message video payload 408, message audio payload 410) is to be presented or made accessible to a user via the messaging client application 104.

A message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address or device identifier) indicative of a user of the client device 102 on which the message 400 was generated and from which the message 400 was sent A message receiver identifier 424: an identifier (e.g., a messaging system identifier, email address or device identifier) indicative of a user of the client device 102 to which the message 400 is addressed.

The contents (e.g. values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
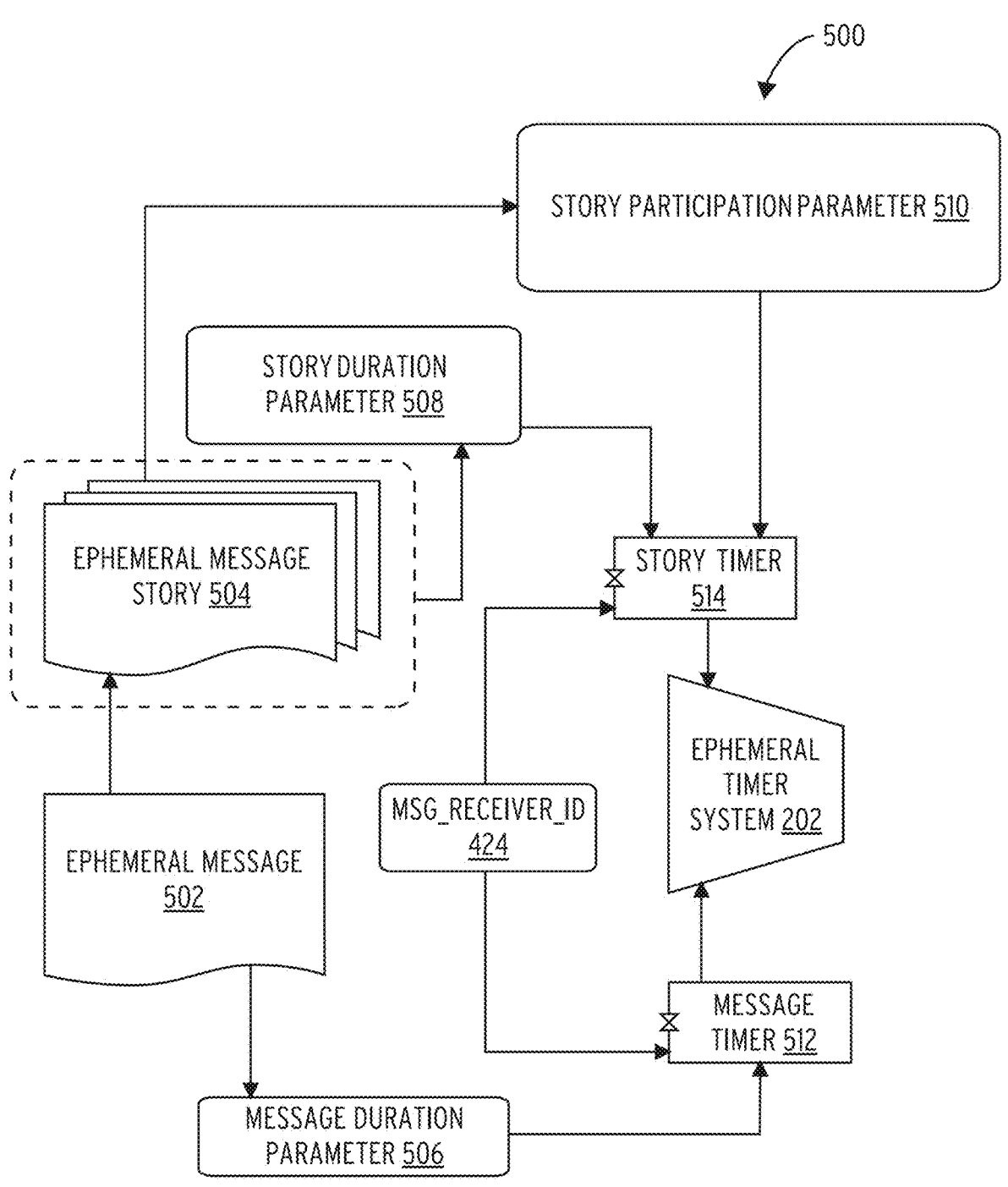
FIG. 5 is a schematic diagram illustrating an example access-limiting process, in terms of which access to content (e.g., an ephemeral message, and associated multimedia payload of data) or a content collection (e.g., an ephemeral message story) may be time-limited (e.g., made ephemeral).

FIG. 5 is a schematic diagram illustrating an access-limiting process 500, in terms of which access to content (e.g., an ephemeral message 502, and associated multimedia payload of data) or a content collection (e.g., an ephemeral message story 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, where the messaging client application 104 is a SNAPCHAT application client, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 504 (e.g., a personal SNAPCHAT story, or an event story). The ephemeral message story 504 has an associated story duration parameter 508, a value of which determines a time-duration for which the ephemeral message story 504 is presented and accessible to users of the messaging system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504. Accordingly, a particular ephemeral message story 504 may "expire" and become inaccessible within the context of the ephemeral message story 504, prior to the ephemeral message story 504 itself expiring in terms of the story duration parameter 508. The story duration parameter 508, story participation parameter 510, and message receiver identifier 424 each provide input to a story timer 514, which operationally determines, firstly, whether a particular ephemeral message 502 of the ephemeral message story 504 will be displayed to a particular receiving user and, if so, for how long. Note that the ephemeral message story 504 is also aware of the identity of the particular receiving user as a result of the message receiver identifier 424.

Accordingly, the story timer 514 operationally controls the overall lifespan of an associated ephemeral message story 504, as well as an individual ephemeral message 502 included in the ephemeral message story 504. In one embodiment, each and every ephemeral message 502 within the ephemeral message story 504 remains viewable and accessible for a time-period specified by the story duration parameter 508. In a further embodiment, a certain ephemeral message 502 may expire, within the context of ephemeral message story 504, based on a story participation parameter 510. Note that a message duration parameter 506 may still determine the duration of time for which a particular ephemeral message 502 is displayed to a receiving user, even within the context of the ephemeral message story 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message story 504.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508.

In certain use cases, a creator of a particular ephemeral message story 504 may specify an indefinite story duration parameter 508. In this case, the expiration of the story participation parameter 510 for the last remaining ephemeral message 502 within the ephemeral message story 504 will determine when the ephemeral message story 504 itself expires. In this case, a new ephemeral message 502, added to the ephemeral message story 504, with a new story participation parameter 510, effectively extends the life of an ephemeral message story 504 to equal the value of the story participation parameter 510.

Responsive to the ephemeral timer system 202 determining that an ephemeral message story 504 has expired (e.g., is no longer accessible), the ephemeral timer system 202 communicates with the messaging system 100 (and, for example, specifically the messaging client application 104 to cause an indicium (e.g., an icon) associated with the relevant ephemeral message story 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Figure 6:
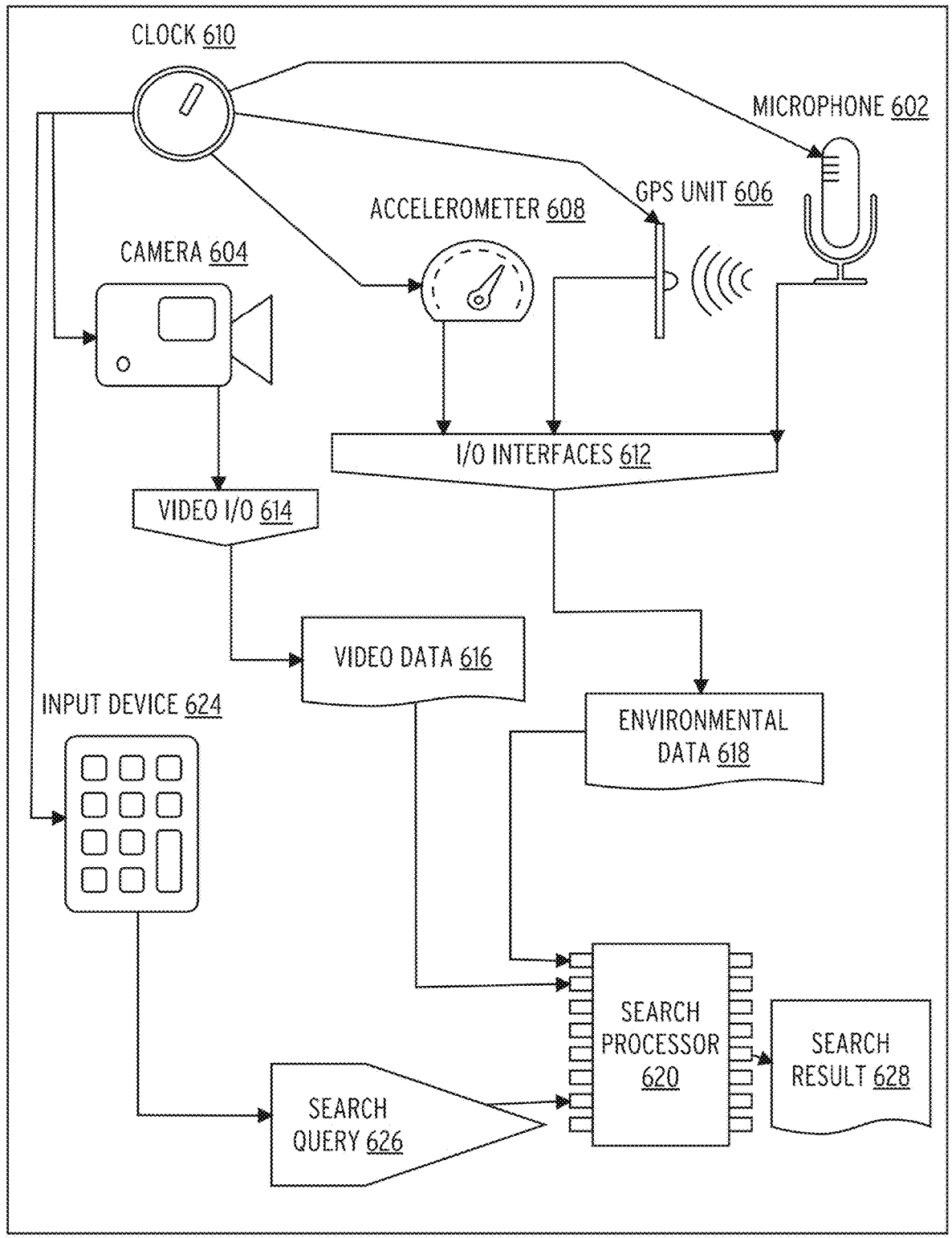
FIG. 6 is a schematic diagram illustrating various hardware components of a messaging system, according to some example embodiments.

FIG. 6 is a schematic diagram illustrating various hardware components of a messaging system 100, according to some example embodiments. As noted elsewhere herein, the messaging system 100 may include both the messaging client application 104 and the messaging server system 108. The location of certain of the components described with reference to FIG. 6 is a design choice, and fungible. Certain embodiments may be implemented as a peer-to-peer system, in which the messaging server system 108 provides relatively little processing. In these embodiments, the majority of the components described with reference to FIG. 6 may form part of a client device 102. Certain other embodiments may be implemented using a "thin client" architecture, in which case most of the processing power (and associated components) are located within an application server 112.

Referring specifically to FIG. 6, the messaging system 100 is shown to include various I/O components 1718 including a microphone 602, a camera 604, a GPS unit 606, an accelerometer 608 and an input device 624 (e.g., an alphanumeric keyboard or tactile touchscreen). Each of these components is coupled to a clock 610, which provides time information to these components. Accordingly, the various components are able to time stamp (or otherwise associate time information with) outputted data. For example, the clock 610 may output time and data information, or otherwise simple internal timing information, with which the various components are able to time stamp respective outputs.

The components provide respective outputs to appropriate input/output (I/O) interfaces. Specifically, the camera 604 is communicatively coupled to a video I/O interface 614, while the other components are shown coupled to further I/O interfaces 612. The camera 604, via the video I/O interface 614, outputs time-stamped video data 616 to an input port of a search processor 620. Similarly, the other components, via the I/O interfaces 612, output other types of environmental data 618 to respective input ports of the search processor 620. Specifically, the accelerometer 608 outputs motion data, the GPS unit 606 outputs location data (e.g., latitudinal and longitudinal coordinates), and the microphone 602 outputs audio data. Other I/O devices output other forms of environmental data 618.

Figure 7:
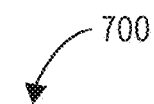
FIG. 7 is a schematic diagram illustrating various processors that may be implemented as part of a search processor, according to certain example embodiments.

FIG. 7 is a schematic diagram illustrating various processors 700 that may be implemented as part of the search processor 620. These processors 700 may, in some example embodiments, be instantiated temporarily within the context of the search processor 620 by instructions received from storage or memory associated with the search processor 620. In other embodiments, these processors 700 may be hardwired or permanently configured as components of the search processor 620 (e.g., as ASIC components).

The processors 700 include image processors 702, audio processor 704, motion processors 706 and location processors 708. These processors 700, as will be described in further detail herein, process the environmental data received at the search processor 620 from the various I/O components of the messaging system 100. The processors 700 may also share a certain functionality and components.

The processors 700 are also shown to be communicatively coupled to each other, and to I/O pins of the search processor 620. In one embodiment, these couplings are implement via a bus 710. Where multiple processors 700 exist contemporaneously, communications may be achieved through signal transmission (e.g., over appropriate circuits and buses) between or among two or more of the processors 700 and/or pins via the bus 710. In embodiments in which multiple processors 700 are configured or instantiated at different times, communications between the processors 700 may be achieved, for example, through the storage and retrieval of information in memory structures to which the processors 700 have access.

Figure 8:
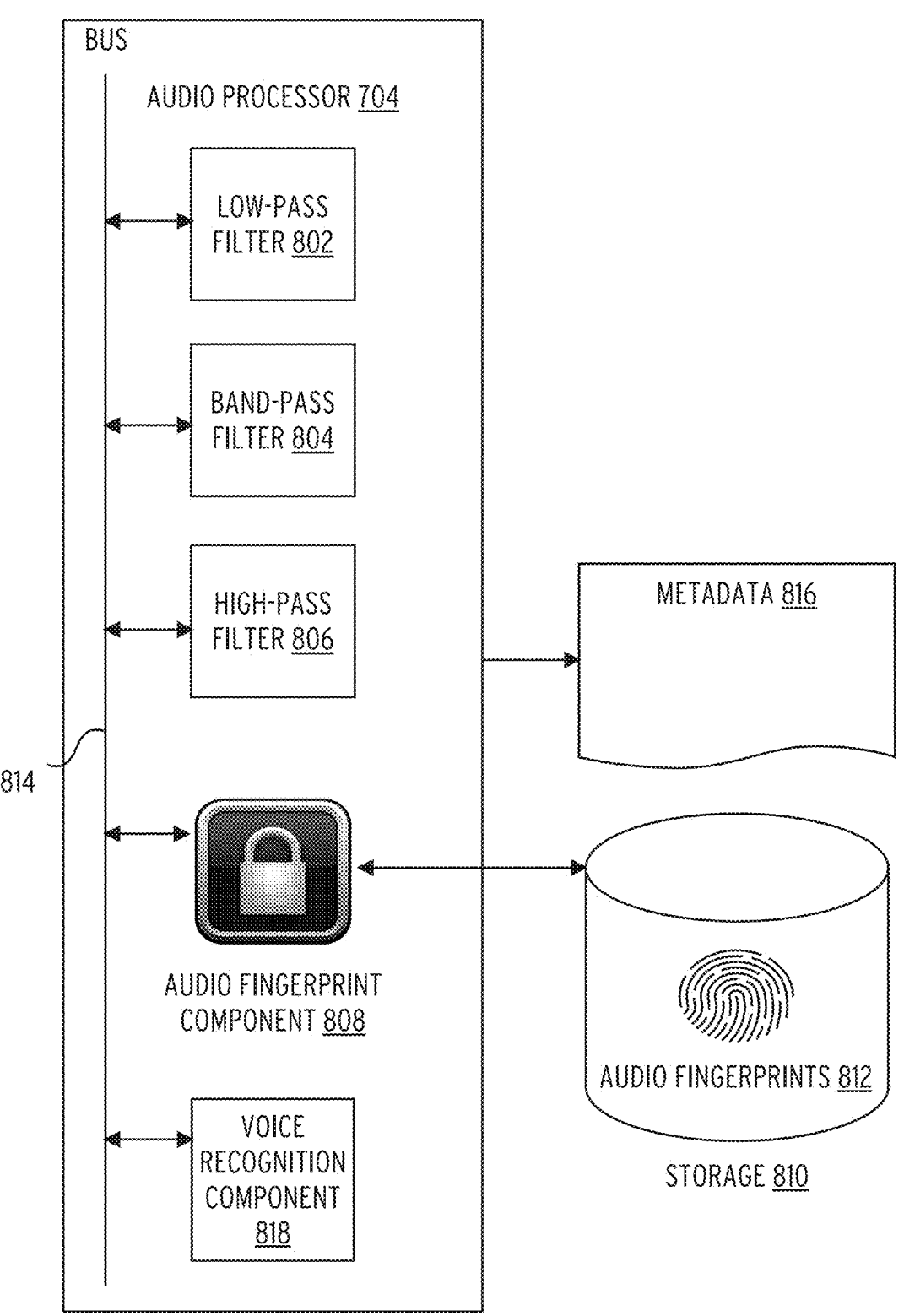
FIG. 8 is a schematic diagram showing further architectural details of audio processors, according to some examples.

FIG. 8 is a schematic diagram showing further architectural details of an audio processor 704, according to some examples.

Specifically, the audio processor 704 includes a number of filters and sub-systems, namely a low-pass filter 802, a band-pass filter 804, a high-pass filter 806, an audio fingerprint component 808 and a voice recognition component 818. The audio processor 704 receives environmental data 618 in the form of audio data (e.g., from the microphone 602) collected from an environment (or context) in which the client device 102 is located. The filters are deployed to isolate various components of the audio data for further processing. The low-pass filter 802 operationally isolates background audio data, while the high-pass filter 806 is tuned to operationally isolate voice frequencies with the audio data. The band-pass filter 804 is tuned to isolate frequencies of audio data (e.g., a combination of frequencies) that may be used to generate contextual markers for a specific context or environment.

The audio fingerprint component 808 receives and processes isolated audio data from the filters, and operationally attempts to match audio fingerprints 812, stored in an associated storage 810, with hashed versions of the isolated audio data received from the filters. For example, the storage 810 may store a collection of audio fingerprints 812 related to a known location in a museum. In this example, a particular sound (e.g., a background recording or combination of environments sounds) is typically present at the know location, and an audio fingerprints 812 is generated based on the particular sound. Low-pass audio data received from the low-pass filter 802 is hashed and compared to the audio fingerprints 812 by the audio fingerprint component 808. An audio print match is then used to generate metadata, based on the audio data and the associated time stamps. From example, the metadata 816 may be generated to identify the museum location at which the matching audio fingerprints 812 were generated, as well as the names (or other identifiers) of displays, content and items located within a specific proximity of the museum location. This metadata 816 is then associated with corresponding video data 616, using time stamp data.

The voice recognition component 818 operationally receives audio data from either the band-pass filter 804 or the high-pass filter 806, and generates textual data based in the received audio data. For example, the voice recognition component 818 may include (or remotely access) voice recognition technology developed by NUANANCE TECHNOLOGIES in order to generate textual data, which is time stamped to generate the metadata 816 outputted by the audio processor 704. For example, a user of the client device 102 may provide a verbal description via the microphone 602 of what is being recorded (or other relevant commentary) while recording specific video data 616. This captured audio data is then automatically transcribed by the voice recognition component 818 to generate the metadata 816, which is the associated with the specific video data 616.

In the examples manners described above, video data 616 is associated with metadata 816 generated using audio data captured using the microphone 602 of a client device 102.

Figure 9:
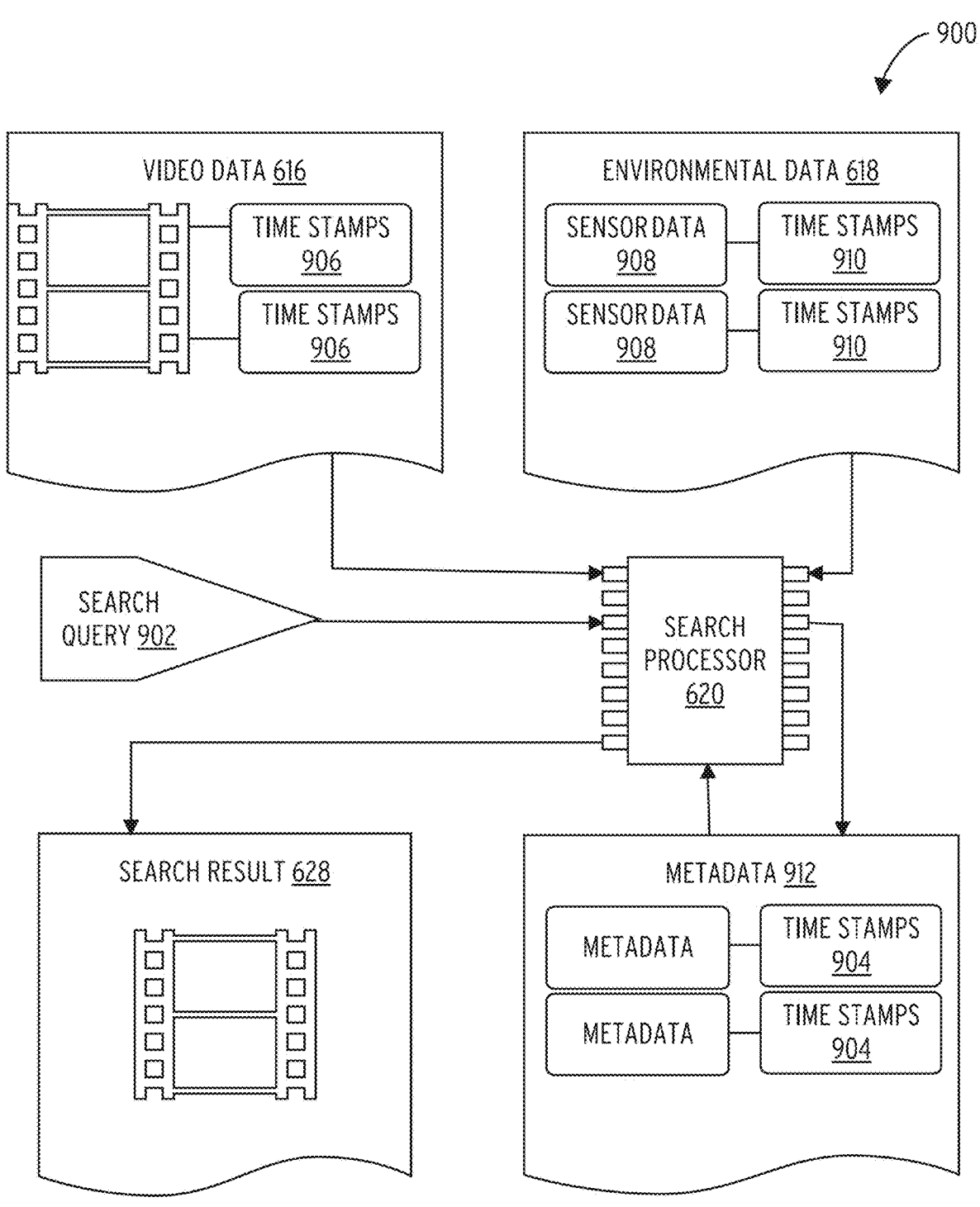
FIG. 9 is a schematic diagram illustrating the association of time information with environmental information, according to some examples.

FIG. 9 is a schematic diagram illustrating the association of time information with environmental information, according to some examples.

As mentioned with respect to an earlier figure, video data 616 and environmental data 618 may be time stamped with time information received from the clock 610 by various components. To this end, FIG. 9 shows (1) frames of video data 616, each time stamped with a respective time stamps 906 and (2) environmental data 618, in the example form of instances of sensor data 908, each time stamped with a respective time stamps 910. The video data 616 and the environmental data 618 are shown to be input to the search processor 620. The search processor 620 uses the environmental data 618 to generate and output metadata 912, instances of which are also each time stamped with a respective time stamps 904. This metadata 912 is stored within memory or storage 810 (e.g., database 120), and is accessible by the search processor 620 for use in responding to a search query 902, responsive to which a search result 628 (e.g., including video data 616) is outputted.

The metadata 912 is associated with the video data 616, using respective time stamps 906 and time stamps 904, so that particular metadata 912 is associated with a particular frame (or series of frames) of the video data 616. In one example, the metadata 912 may be incorporated into the message tag 420 of a message 400, so as to render the message 400 locatable by a search. In other embodiments, the metadata 912 may simply be associated with or related to the video data 616 by way of pointers.

In examples, the metadata 912 renders the video data 616 more richly searchable by providing text information that can be conveniently and easily searched in order to identify particular frames of the video data 616. The environmental data 618 may be used to generate a deep and rich body of metadata 912 that is temporally associated with the video data 616. To this end, the metadata 912 may provide a rich body of environmental and contextual information that is associated with the video data 616 in order to render it searchable in ways that has not previously been possible.

For example, using information received from a variety of sensors, a variety of different types of metadata 912 may be generated and associated with a particular frame or series of frames of the video data 616. Consider that information outputted from the accelerometer 608 may be used to generate metadata 912 providing contextual speed information, identifying the speed at which a mobile client device 102 was travelling when used to capture a particular set of frames of the video data 616.

Similarly, audio data may be processed to identify a wide variety of environmental and contextual characteristics applicable to the capture environment and context of a frame or series of frames of the video data 616. For example, the identification of background noise from airplanes may indicate that particular video data 616 was taken in geographic proximity to an airport. Background noise from trains may indicate that video data 616 was captured in a train station. Audio data may similarly be analyzed, using voice recognition technology, to identify a speaker, or specific content that was being broadcast (e.g., a broadcast television show) at a particular time. Music audio may also be analyzed to identify a particular song or band playing in the background while certain video data 616 was captured. The identification of such a song or band may allow the location and time at which particular video data 616 were captured to be ascertained with a relatively high degree of accuracy and certainty.

Multiple types of environmental data 618 may also be combined to increase certainty regarding the validity and applicability of some assumptions made during the generation of metadata 912. For example, a high degree of correlation between location data, outputted by a GPS unit 606, and audio data outputted by a microphone 602, allows a high degree of certainty to be attributed to certain metadata 912 (e.g., that a video was captured at a specific music concert on a specific date).

FIG. 10 is a flowchart illustrating a method 1000, according to some examples, of processing image data.

The method 1000 commences at block 1002 with the receiving of environmental data 618 and associated capture time data from the sensors of a mobile computing device. With specific reference to FIG. 6, environmental data 618 may be received at the search processor 620 from any one of the I/O devices of the messaging system 100, including speed information from the accelerometer 608, location information from the GPS unit 606, and audio data from the microphone 602. The environmental data 618 is received at the search processor 620, via the I/O interfaces 612. In some examples, with reference to FIG. 9, the environmental data is sensor data 908, instances of which are time stamped with a respective time stamps 910.

At block 1004, the search processor 620 operates to generate metadata 912, using the environmental data 618 as input. In one example, the environmental data 618 is audio data, and the search processor 620 processes this environmental data 618 in order to identify a sound within the audio data that is associated with a place, object, event or entity. To this end, the audio processor 704 of the search processor 620 are deployed to isolate and extract specific frequencies or sound types from the audio data. The low-pass filter 802, the band-pass filter 804, and the high-pass filter 806 are employed, as described above with reference to FIG. 8, to filter the received audio data to generate filtered audio data. The low-pass filter 802 may be used to extract background audio data, which is then provided as input to the audio fingerprint component 808 for further processing.

The audio processor 704 uses fingerprinting technology (e.g., the audio fingerprint component 808, which operatively generates audio fingerprints from the received audio data and compares these fingerprints to the audio fingerprints 812 stored in storage 810) to identify places, objects, events and entities.

The audio processor 704 also use the voice recognition component 818 to perform voice recognition and generate textual data (e.g., a collection of words) from the audio data.

At block 1006, the search processor 620 time stamps the metadata 912 with time stamps 904 (e.g., corresponding to the time stamps 910).

At block 1008, the search processor 620 receives the video data 616, from the camera 604 via the video I/O interface 614, for processing. At block 1010, the search processor 620 correlates the video data 616 with the metadata 912, using the time stamps 906 and the time stamps 904. In one embodiment, the video data 616 comprises video data included in a message 400 (e.g., as message video payload 408), and the message tag 420 of the relevant message 400 is updated to include the metadata 912. In a further embodiment, a pointer in the message tag 420 is updated to identify a particular instance of the metadata 912, based on a correlation of the time stamps 906 and the time stamps 904.

At block 1012, the search processor 620 receives a search query 902. The search query 902 includes search criteria, which may include a textual search criterion (e.g., a word or collection of keywords for text-based searching), an audio search criterion (e.g., for audio-based searching), or an image search criterion (e.g., an image or video data, for image-based searching).

The search processor 620 then performs the appropriate processing of the search query 902, depending on the type and form of the search criteria. For example, where the search criteria includes an image, the image may be analyzed using the image processors 702 to perform entity identification (e.g., object recognition) on the image. Alternatively, an image included in the search criteria may be provided to a third party provider, which then returns keywords that form of the basis for a text-based search.

At block 1014, the search processor 620 identifies a frame, or sequence of frames, within the video data 616 by performing a search of the metadata 912, using the search criterion (or information derived from the search criteria). The search processor 620 may perform a text-based search of the metadata 912 to identify a correspondence between the search criterion and information included in the metadata 912. Having identified one or more instances of the metadata 912 that show a predetermined degree of correlation or correspondence to the search criterion, the search processor 620 then identifies one or more frames of the video data 616 that correlate to the identified metadata 912. In one specific example, the search processor 620 uses keywords, derived from the search criterion of the search query 902, to search for a corresponding message tag 420 of a message 400 stored in the message table 314. In this way, video data, stored in the video table 310 and identified by message video payload 408, maybe identified at block 1014.

The identified frames of the video data 616 are outputted as the search result 628 and displayed on a user interface of the client device 102. The method 1000 then terminates at done block 1016.

Figure 11:
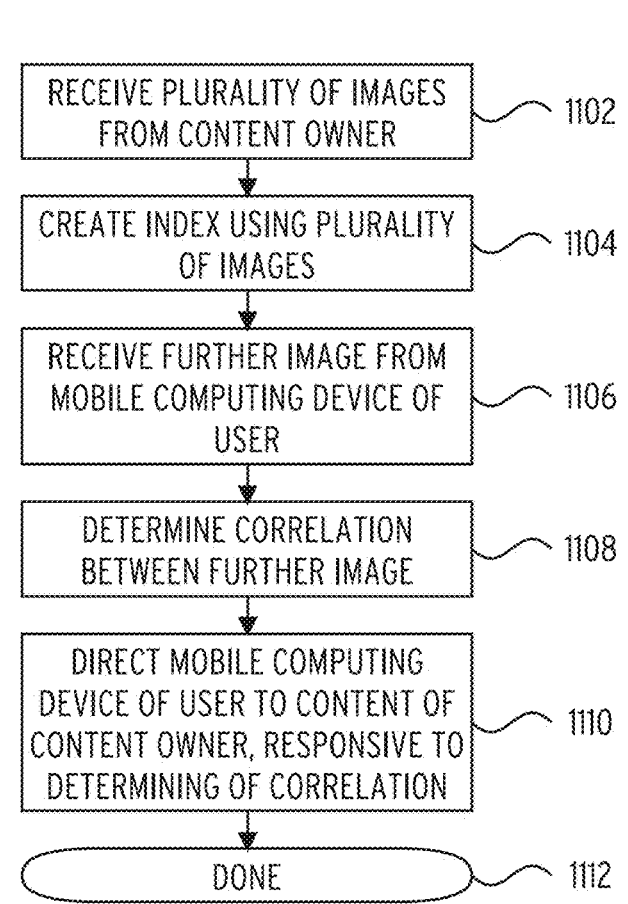
FIG. 11 is a flowchart illustrating a method, according to some examples, of performing an image-based search.

FIG. 11 is a flowchart illustrating a method 1100, according to some examples, of performing an image-based search.

Figure 12:
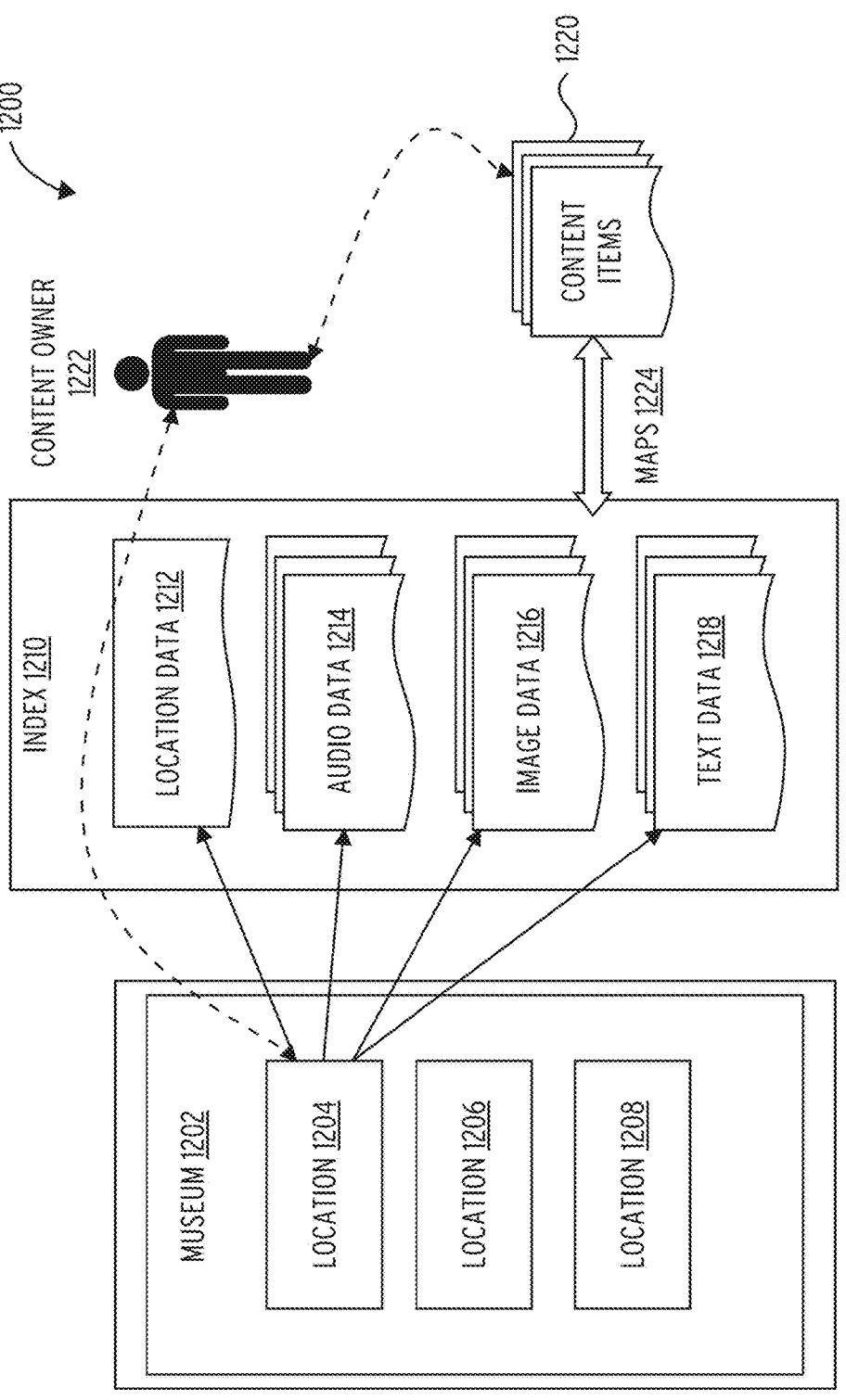
FIG. 12 is a schematic diagram showing an example environment within which a method to perform location-based content retrieval may be practiced and deployed.

The method 1100 commences at block 1102, with the receipt of a number of content items (e.g., images) from a content owner 1222 that is associated with a particular entity or location. FIG. 12 is a schematic diagram showing an example environment 1200 within which the method 1100 may be practiced and deployed.

Referring now to FIG. 12, in one example, a particular location 1204 within a museum 1202 has multiple content items associated therewith by a content owner 1222 that together constitute an index 1210. The location 1206 and location 1208 have similar indexes (not shown). Specifically, the location 1204 has the index 1210 including location data 1212, audio data 1214, image data 1216, and text data 1218 associated therewith. In this example, the location 1204 may house an exhibit dealing with a specific period or event in the American Civil War. Here, the location data 1212 specifies the exact GPS coordinates of the exhibit. Instances of the audio data 1214 constitute recordings made at the exhibit, and include both background noise, as well as other ambient noise such as the soundtrack of a video that is part of the exhibit. Instances of the image data 1216 include various images or photographs taken of the exhibit, as well as the surroundings of the exhibit. In one example, the image data 1216 may include a 360° image taken using a specifically adapted camera at the location 1204. The image data 1216 also includes videos captured at the location 1204. Finally, instances of the text data 1218 include textual descriptions of the exhibit, as well as words that are commonly and frequently spoken by either guides or visitors in proximity to the exhibit at the location 1204. As such, the various content items relate to a common entity or event (e.g., the exhibit, or an event depicted or related to the exhibit).

Returning to FIG. 11, at block 1104 the index 1210 of the various content items (e.g., location data 1212, audio data 1214, and image data 1216) is created. In some example environments, this index 1210 is created by the search processor 620, and are stored as metadata 912.

At block 1106, a further image is received from a mobile computing device of a user. In one embodiment, this further images is received as part of a search query 902 by the search processor 620. In addition to the further image, the search query received at block 1106 may also include textual data (e.g., keywords) and audio data (e.g., audio data captured at a specific location of a client device 102).

At block 1108, the search processor 620 determines a correlation between this further image, received in the search query 902, and content of the index 1210 (e.g., the metadata 912). Others correlation may be detected by expanding the search query 902 based on the image included therein. For example, object recognition may be performed with respect to the further image to generate a set of keywords, which are then included in the search query 902. Additionally, audio processing (as described above with reference to FIG. 8) may be performed to also expand the search query based on audio data included therein.

At block 1110, responsive to determining that a predetermined degree of correlation between the further image (and other content) and the index 1210, the mobile computing device of the user may be directed to content of the content owner 1222. Specifically, referring again to FIG. 12, the index 1210 is mapped by maps 1224 to a collection of content items 1220. The content items 1220 constitute further media and content relevant to the location 1204. Again, where the location 1204 houses a museum exhibit, the content items 1220 are various multimedia content items (e.g., a publication, web page, video data, audio data etc.) that relate to, and supplement, the exhibit. In this way, a visitor to the location 1204 may initiate a query or search using environmental and/or contextual information of the exhibit, in order to identify content items 1220 relevant to that exhibit in a convenient and automatic way.

The method 1100 then terminates at done block 1112.

Figure 13:
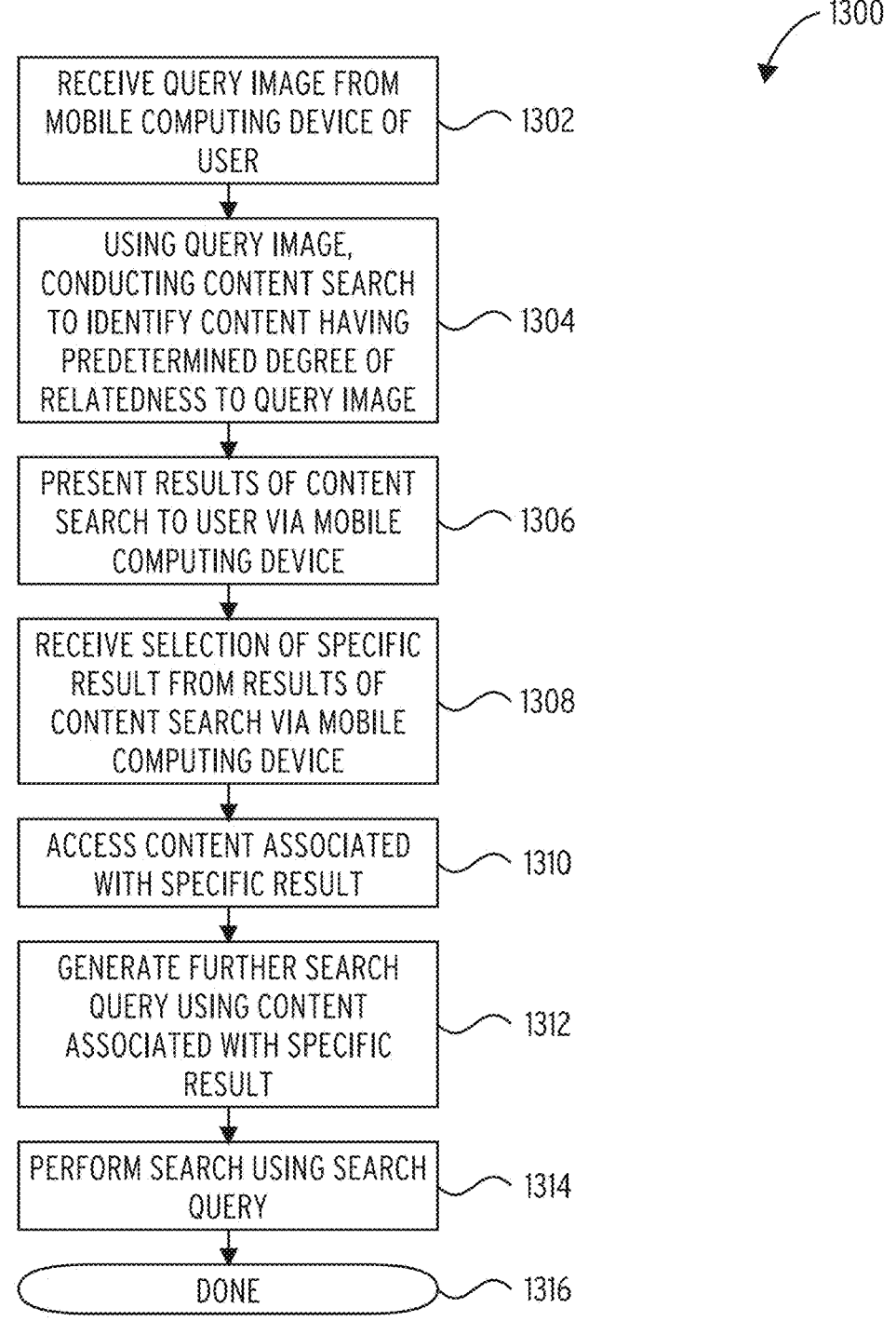
FIG. 13 is a flowchart illustrating a method, according to some examples, of performing a multimedia-content based search.
Figure 14:
FIG. 14 is a user interface diagram showing a search refinement user interface, according to some examples.

FIG. 13 is a flowchart illustrating a method 1300, according to some examples, of performing a multimedia-content based search. The method 1300 will be described with reference to both the flowchart shown in FIG. 13, and the user interface shown in FIG. 14. FIG. 14 is a user interface diagram showing a search refinement user interface 1400, according to some examples.

The method 1300 commences at block 1302 with the receipt of a query image from a mobile computing device of a user. The query image may be received as part of a search query 902, received at the search processor 620 of the messaging system 100. Referring to FIG. 14, the query image may be received from the camera of the client device 102, or may be selected from storage via a user interface presented by the client device 102. The search refinement user interface 1400 of FIG. 14 shows a basketball player image 1402 depicting a basketball player dribbling a basketball. User selection of the basketball player image 1402 by a search initiation action 1404 initiates a search query generation process, by which the query image (e.g., the basketball player image 1402) is provided to the search processor 620.

At block 1304, the search processor 620 uses the query image to conduct a content search to identify further content having a predetermined degree of relatedness to the query image. In one example, the search processor 620 conducts a search of metadata 912 that is associated with further content (e.g., that forms part of a message 400, and is stored in the image table 308, video table 310, or annotation table 312). This search of further content may also include a search of third-party content, and accordingly extend beyond content accessible within the messaging system 100.

Referring to FIG. 14, the search processor 620 processes the basketball player image 1402 to identify different components or aspects thereof. To this end, object recognition may be performed by the image processors 702 to parse the basketball player image 1402 and identify different objects contained within the basketball player image 1402. Processing of the basketball player image 1402 may identify a basketball and basketball clothing, including basketball sneakers. The search query 902 is expanded, based on a number of different objects identified within the basketball player image 1402. Accordingly, the search query 902 may be expanded, responsive to selection of the basketball player image 1402, to search for basketballs, basketball sneakers, and basketball clothing.

At block 1306, the search processor 620 outputs a search result 628, which is presented as search results of the content search to a user by a mobile computing device (e.g., the client device 102). As shown in FIG. 14, the presented search results may thus include a sneaker image 1406, a clothing image 1408, and a basketball image 1410.

At block 1308, selection of a specific search result, from the set of search results, is received via the mobile computing device. For example, an image selection action 1412 of the basketball image 1410 triggers receipt of the basketball image 1410 by the search processor 620.

At block 1310, further content associated with the specific result is accessed. For example, the search processor 620, responsive to receipt of the basketball image 1410, generates a refining further search query 902 at block 1312, initiates a further search, using the refining search query 902, at block 1314. As shown in FIG. 14, this further search, performed responsive to selection of the basketball image 1410, generates a refined search result set including basketball images 1414, 1416, and 1418, which are presented within the search refinement user interface 1400 to a user. The method 1300 then terminates at done block 1316.

Referring to FIG. 14 in particular, it will be appreciated that the method 1300 enables a user to perform an iterative, refining image-based search.

Figure 15:
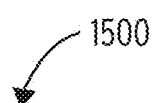
FIG. 15 is a user interface diagram showing a search interface, presented on a client device, according to some examples.

FIG. 15 is a user interface diagram showing a search interface, presented on a client device 102, according to some examples. The interface includes a reference search query image 1502. The query image 1502 may be captured via the camera 604 of the client device 102 or selected from images stored in local storage or remote storage accessible by the messaging client application 104 executing on the client device 102.

The query image 1502 is processed by the image processors 702 of the search processor 620 to generate a collection of search terms 1504. In one example, local image recognition is used to generate the search terms 1504. In another example, a third-party application or service provided may be queried using the query image 1502 in order to receive the search terms 1504. Certain (e.g., one, a sub-set or all) of the search terms 1504 may be designated as "active" or "inactive", either automatically by the messaging client application 104 or manually by a user.

The active search terms 1504 are then used to query a content repository to retrieve and present image results 1506 and video results 1508 within the context of the user interface. The image results 1506 and the video results 1508 may be one or more collections of content (e.g., SNAPCHAT Stories). By varying the active search terms 1504, a user may cause different image results 1506 and video results 1508 to be presented and displayed.

Figure 16:
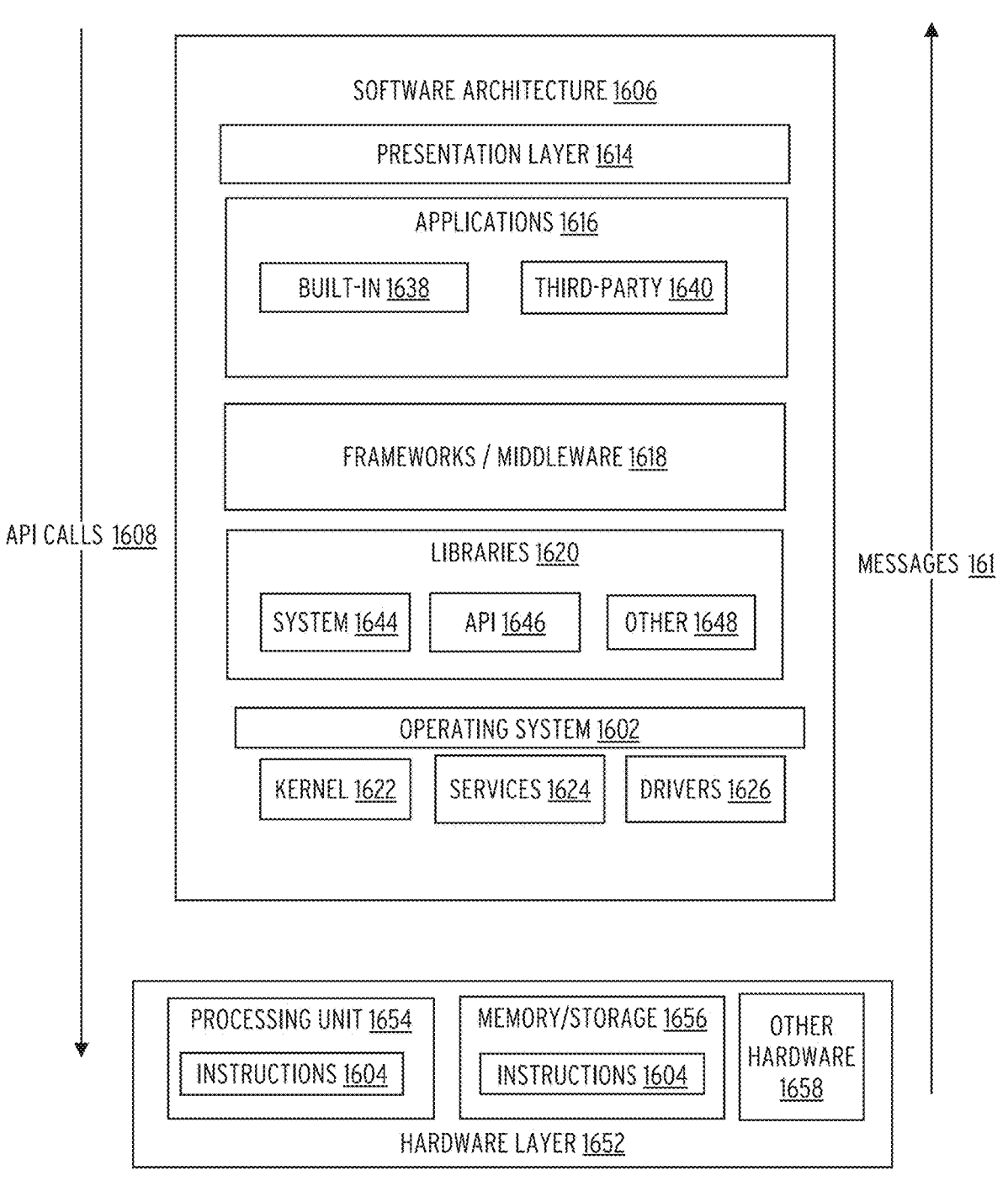
FIG. 16 is a block diagram illustrating a representative software architecture, which may be used in conjunction with various hardware architectures herein described.

FIG. 16 is a block diagram illustrating an example software architecture 1606, which may be used in conjunction with various hardware architectures herein described. FIG. 16 is a non-limiting example of a software architecture and it will be appreciated that many other architectures may be implemented to facilitate the functionality described herein. The software architecture 1606 may execute on hardware such as machine 1700 of FIG. 17 that includes, among other things, processors 1704, memory 1714, and I/O components 1718. A representative hardware layer 1652 is illustrated and can represent, for example, the machine 1700 of FIG. 17. The representative hardware layer 1652 includes a processing unit 1654 having associated executable instructions 1604. Executable instructions 1604 represent the executable instructions of the software architecture 1606, including implementation of the methods, modules and so forth described herein. The hardware layer 1652 also includes memory and/or storage modules memory/storage 1656, which also have executable instructions 1604. The hardware layer 1652 may also comprise other hardware 1658.

In the example architecture of FIG. 16, the software architecture 1606 may be conceptualized as a stack of layers where each layer provides particular functionality. For example, the software architecture 1606 may include layers such as an operating system 1602, libraries 1620, applications 1616 and a presentation layer 1614. Operationally, the applications 1616 and/or other components within the layers may invoke application programming interface (API) API calls 1608 through the software stack and receive a response as in response to the API calls 1608. The layers illustrated are representative in nature and not all software architectures have all layers. For example, some mobile or special purpose operating systems may not provide a frameworks/middleware 1618, while others may provide such a layer. Other software architectures may include additional or different layers.

The operating system 1602 may manage hardware resources and provide common services. The operating system 1602 may include, for example, a kernel 1622, services 1624 and drivers 1626. The kernel 1622 may act as an abstraction layer between the hardware and the other software layers. For example, the kernel 1622 may be responsible for memory management, processor management (e.g., scheduling), component management, networking, security settings, and so on. The services 1624 may provide other common services for the other software layers. The drivers 1626 are responsible for controlling or interfacing with the underlying hardware. For instance, the drivers 1626 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1620 provide a common infrastructure that is used by the applications 1616 and/or other components and/or layers. The libraries 1620 provide functionality that allows other software components to perform tasks in an easier fashion than to interface directly with the underlying operating system 1602 functionality (e.g., kernel 1622, services 1624 and/or drivers 1626). The libraries 1620 may include system libraries 1644 (e.g., C standard library) that may provide functions such as memory allocation functions, string manipulation functions, mathematical functions, and the like. In addition, the libraries 1620 may include API libraries 1646 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1620 may also include a wide variety of other libraries 1648 to provide many other APIs to the applications 1616 and other software components/modules.

The frameworks/middleware 1618 (also sometimes referred to as middleware) provide a higher-level common infrastructure that may be used by the applications 1616 and/or other software components/modules. For example, the frameworks/middleware 1618 may provide various graphic user interface (GUI) functions, high-level resource management, high-level location services, and so forth. The frameworks/middleware 1618 may provide a broad spectrum of other APIs that may be utilized by the applications 1616 and/or other software components/modules, some of which may be specific to a particular operating system 1602 or platform.

The applications 1616 include built-in applications 1638 and/or third-party applications 1640. Examples of representative built-in applications 1638 may include, but are not limited to, a contacts application, a browser application, a book reader application, a location application, a media application, a messaging application, and/or a game application. Third-party applications 1640 may include an application developed using the ANDROID™ or IOS™ software development kit (SDK) by an entity other than the vendor of the particular platform, and may be mobile software running on a mobile operating system such as IOS™ ANDROID™, WINDOWS® Phone, or other mobile operating systems. The third-party applications 1640 may invoke the API calls 1608 provided by the mobile operating system (such as operating system 1602) to facilitate functionality described herein.

The applications 1616 may use built in operating system functions (e.g., kernel 1622, services 1624 and/or drivers 1626), libraries 1620, and frameworks/middleware 1618 to create user interfaces to interact with users of the system. Alternatively, or additionally, in some systems interactions with a user may occur through a presentation layer, such as presentation layer 1614. In these systems, the application/module "logic" can be separated from the aspects of the application/module that interact with a user.

Figure 17:
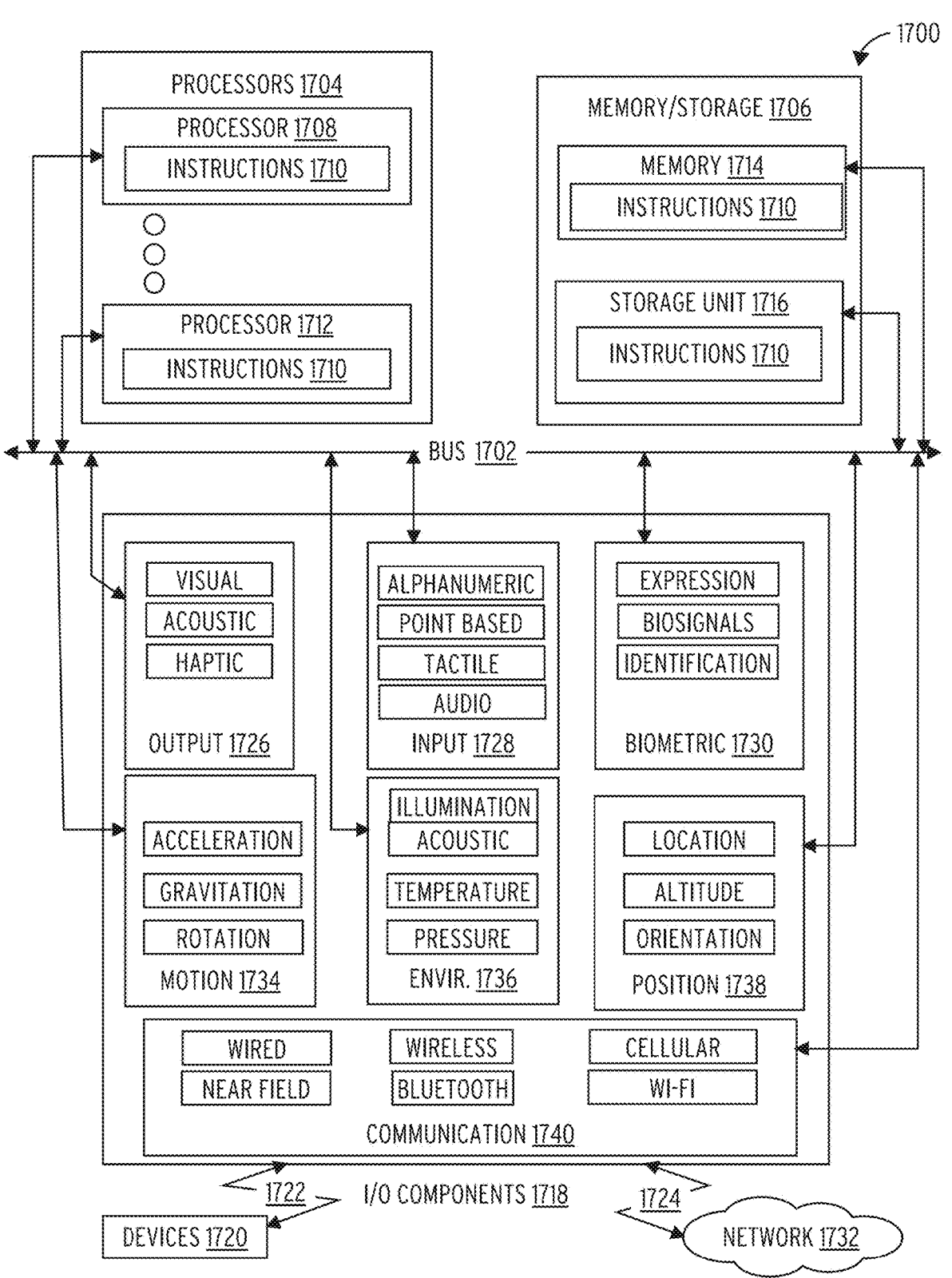
FIG. 17 is a block diagram illustrating components of a machine, according to some example embodiments, able to read instructions from a machine-readable medium (e.g., a machine-readable storage medium) and perform any one or more of the methodologies discussed herein.

FIG. 17 is a block diagram illustrating components of a machine 1700, according to some example embodiments, able to read instructions from a machine-readable medium (e.g., a machine-readable storage medium) and perform any one or more of the methodologies discussed herein. Specifically, FIG. 17 shows a diagrammatic representation of the machine 1700 in the example form of a computer system, within which instructions 1710 (e.g., software, a program, an application, an applet, an app, or other executable code) for causing the machine 1700 to perform any one or more of the methodologies discussed herein may be executed. As such, the instructions 1710 may be used to implement modules or components described herein. The instructions 1710 transform the general, non-programmed machine 1700 into a particular machine 1700 programmed to carry out the described and illustrated functions in the manner described. In alternative embodiments, the machine 1700 operates as a standalone device or may be coupled (e.g., networked) to other machines. In a networked deployment, the machine 1700 may operate in the capacity of a server machine or a client machine in a server-client network environment, or as a peer machine in a peer-to-peer (or distributed) network environment. The machine 1700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1710, sequentially or otherwise, that specify actions to be taken by machine 1700. Further, while only a single machine 1700 is illustrated, the term "machine" shall also be taken to include a collection of machines that individually or jointly execute the instructions 1710 to perform any one or more of the methodologies discussed herein.

The machine 1700 may include processors 1704, memory memory/storage 1706, and I/O components 1718, which may be configured to communicate with each other such as via a bus 1702. The memory/storage 1706 may include a memory 1714, such as a main memory, or other memory storage, and a storage unit 1716, both accessible to the processors 1704 such as via the bus 1702. The storage unit 1716 and memory 1714 store the instructions 1710 embodying any one or more of the methodologies or functions described herein. The instructions 1710 may also reside, completely or partially, within the memory 1714, within the storage unit 1716, within at least one of the processors 1704 (e.g., within the processor's cache memory), or any suitable combination thereof, during execution thereof by the machine 1700. Accordingly, the memory 1714, the storage unit 1716, and the memory of processors 1704 are examples of machine-readable media.

The I/O components 1718 may include a wide variety of components to receive input, provide output, produce output, transmit information, exchange information, capture measurements, and so on. The specific I/O components 1718 that are included in a particular machine 1700 will depend on the type of machine. For example, portable machines such as mobile phones will likely include a touch input device or other such input mechanisms, while a headless server machine will likely not include such a touch input device. It will be appreciated that the I/O components 1718 may include many other components that are not shown in FIG. 17. The I/O components 1718 are grouped according to functionality merely for simplifying the following discussion and the grouping is in no way limiting. In various example embodiments, the I/O components 1718 may include output components 1726 and input components 1728. The output components 1726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1728 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1718 may include biometric components 1730, motion components 1734, environmental environment components 1736, or position components 1738 among a wide array of other components. For example, the biometric components 1730 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1734 may include acceleration sensor components (e.g., accelerometer), gravitation sensor components, rotation sensor components (e.g., gyroscope), and so forth. The environment components 1736 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1738 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1718 may include communication components 1740 operable to couple the machine 1700 to a network 1732 or devices 1720 via coupling 1722 and coupling 1724 respectively. For example, the communication components 1740 may include a network interface component or other suitable device to interface with the network 1732. In further examples, communication components 1740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1720 may be another machine or any of a wide variety of peripheral devices (e.g., a peripheral device coupled via a Universal Serial Bus (USB)).

Moreover, the communication components 1740 may detect identifiers or include components operable to detect identifiers. For example, the communication components 1740 may include Radio Frequency Identification (RFID)

tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1740, such as, location via Internet Protocol (IP) geo-location, location via Wi-Fi® signal triangulation, location via detecting a NFC beacon signal that may indicate a particular location, and so forth.

What is claimed is:

1. A method comprising:

for each of a plurality of sub-locations of a geographic location, compiling and storing on a machine-readable memory a respective sub-location index, each sub-location index comprising a set of content items comprising:

image data comprising photographic and/or video items captured at the respective sub-location, and text data comprising verbiage frequently spoken at the respective sub-location;

receiving from a mobile computing device associated with a user a search query comprising image query data; and in an automated operation performed using one or more computer processor devices, performing operations comprising:

performing image analysis of the image query data;

based on the image analysis, compiling an augmented search query by generating and incorporating in the search query a set of keywords;

identifying as search result a specific sub-location based at least in part on determining a correlation between the augmented search query and the respective sub-location index of said specific sub-location;

returning to the mobile computing device responsive to the search query the search result identifying said specific sub-location; and directing the mobile computing device to the specific sub-location indicated by the search result.

2. The method of claim 1, wherein the text data of each sub-location index comprises a textual description of the respective sub-location.

3. The method of claim 1, wherein the performing of the image analysis comprises:

performing object recognition to identify multiple distinct objects within the image query data;

generating a respective keyword for each identified object; and incorporating the generated keywords into the augmented search query.

4. The method of claim 3, wherein the object recognition comprises:

parsing the image query data to identify different components and aspects thereof; and generating descriptive keywords for each identified component and aspect.

5. The method of claim 1, wherein compiling the augmented search query comprises:

providing the image query data to a third-party provider;

receiving keywords from the third-party provider based on their analysis of the image query data; and incorporating the received keywords into the augmented search query.

6. The method of claim 1, further comprising:

receiving audio data associated with the image query data;

performing voice recognition on the received audio data to generate textual data; and incorporating the generated textual data into the augmented search query.

7. The method of claim 6, wherein the performing of the voice recognition comprises:

filtering the received audio data using at least one of a band-pass filter and a high-pass filter to isolate voice frequencies; and generating text from the filtered audio data.

8. The method of claim 1, further comprising:

receiving ambient audio data captured at a location of the mobile computing device;

processing the ambient audio data through an audio fingerprint component to generate location-identifying text; and incorporating the location-identifying text into the augmented search query.

9. The method of claim 8, wherein the processing of the ambient audio data comprises:

filtering the ambient audio data using a low-pass filter to isolate background audio data;

comparing the filtered background audio data to stored audio fingerprints; and generating text metadata based on matching audio fingerprints.

10. The method of claim 1, wherein the compiling of the augmented search query comprises:

analyzing received audio data to identify spoken descriptions of content captured in the image query data; and incorporating text corresponding to the identified spoken descriptions into the augmented search query.

11. The method of claim 1, wherein the geographic location is a museum, each sub-location comprising a respective display within the museum.

12. A system comprising:

at least one processor; and at least one memory storing instructions that, when executed by the at least one processor, configure the system to:

for each of a plurality of sub-locations of a geographic location, compile and store on a machine-readable memory a respective sub-location index, each sub-location index comprising a set of content items comprising:

image data comprising photographic and/or video items captured at the respective sub-location, and text data comprising a textual description of the respective sub-location;

receive from a mobile computing device associated with a user a search query comprising image query data;

perform image analysis of the image query data;

based on the image analysis, compile an augmented search query by generating and incorporating in the search query a set of keywords;

identify as search result a specific sub-location based at least in part on determining a correlation between the augmented search query and the respective sub-location index of said specific sub-location;

return to the mobile computing device responsive to the search query the search result identifying said specific sub-location; and direct the mobile computing device to the specific sub-location indicated by the search result.

13. The system of claim 12, wherein the text data of each sub-location index comprises verbiage frequently spoken at the respective sub-location.

14. The system of claim 12, wherein the performing of the image analysis comprises:

performing object recognition to identify multiple distinct objects within the image query data;

generating a respective keyword for each identified object; and incorporating the generated keywords into the augmented search query.

15. The system of claim 12, wherein the instructions further configure the system to:

receive audio data associated with the image query data;

perform voice recognition on the received audio data to generate textual data; and incorporate the generated textual data into the augmented search query.

16. The system of claim 12, wherein the instructions further configure the system to:

receive ambient audio data captured at a location of the mobile computing device;

process the ambient audio data through an audio fingerprint component to generate location-identifying text; and incorporate the location-identifying text into the augmented search query.

17. The system of claim 12, wherein the geographic location is a museum, each sub-location comprising a respective display within the museum.

18. A non-transitory computer-readable storage medium including instructions that when executed by a computer, cause the computer to:

for each of a plurality of sub-locations of a geographic location, compile and store on a machine-readable memory a respective sub-location index, each sub-location index comprising a set of content items comprising:

image data comprising photographic and/or video items captured at the respective sub-location, and text data comprising verbiage frequently spoken at the respective sub-location;

receive from a mobile computing device associated with a user a search query comprising image query data;

perform image analysis of the image query data;

based on the image analysis, compile an augmented search query by generating and incorporating in the search query a set of keywords;

identify as search result a specific sub-location based at least in part on determining a correlation between the augmented search query and the respective sub-location index of said specific sub-location;

return to the mobile computing device responsive to the search query the search result identifying said specific sub-location; and direct the mobile computing device to the specific sub-location indicated by the search result.

* * * * *